United States Patent
Zakian et al.

(10) Patent No.: US 11,782,978 B1
(45) Date of Patent: Oct. 10, 2023

(54) TECHNIQUES FOR STORING AND ANALYZING DATA

(71) Applicant: Amazon Technologies, Inc., Seattle, WA (US)

(72) Inventors: Christopher Samuel Zakian, Brier, WA (US); Ross Eric Larson, Seattle, WA (US); Eugene Kwon, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 16/706,540

(22) Filed: Dec. 6, 2019

(51) Int. Cl.
G06F 16/71 (2019.01)
G06F 16/172 (2019.01)
G06F 21/60 (2013.01)
G06F 16/23 (2019.01)
G06F 16/21 (2019.01)
G06F 16/11 (2019.01)

(52) U.S. Cl.
CPC .......... G06F 16/71 (2019.01); G06F 16/113 (2019.01); G06F 16/172 (2019.01); G06F 16/212 (2019.01); G06F 16/2379 (2019.01); G06F 21/602 (2013.01)

(58) Field of Classification Search
CPC ..... G06F 16/113; G06F 16/172; G06F 16/212; G06F 16/2379; G06F 16/71; G06F 21/602
See application file for complete search history.

(56) References Cited

U.S. PATENT DOCUMENTS

| | | | | |
|---|---|---|---|---|
| 2006/0010472 | A1* | 1/2006 | Godeny | H04N 21/4334 725/62 |
| 2009/0214044 | A1* | 8/2009 | Kinoshita | G06F 21/602 713/193 |
| 2013/0156185 | A1* | 6/2013 | Kim et al. | G08B 13/19686 380/210 |
| 2014/0359652 | A1* | 12/2014 | Ghorbel et al. | H04N 21/234318 725/25 |
| 2016/0210306 | A1* | 7/2016 | Kumarasamy et al. | G06F 16/178 |
| 2016/0246726 | A1* | 8/2016 | Hahn | G06F 3/0679 |
| 2017/0083517 | A1* | 3/2017 | Mitkar et al. | G06F 16/5838 |
| 2018/0232592 | A1* | 8/2018 | Stewart et al. | G08B 13/19606 |
| 2018/0349708 | A1* | 12/2018 | van Hoof et al. | G08B 13/19684 |
| 2019/0005031 | A1* | 1/2019 | Kataria et al. | H04L 67/1097 |
| 2019/0042851 | A1* | 2/2019 | Varadarajan et al. | G06K 9/00771 |
| 2019/0057150 | A1* | 2/2019 | An | G06F 16/434 |

* cited by examiner

*Primary Examiner* — Matthew J Ellis
(74) *Attorney, Agent, or Firm* — Lee & Hayes, P.C.

(57) ABSTRACT

Systems and techniques for storing and analyzing data. For instance, computing device(s) may store sensor data in first data files included within a first data buffer of a first memory, which may include a cache memory. The computing device(s) may then store metadata in metadata files included in a first metadata buffer of the first memory, where the first metadata files correspond to the first data files. After storing the data, the computing device(s) may determine that the sensor data represents an event. As such, the computing device(s) may store the sensor data in second data files included in a second data buffer of a second memory, which may include an archive memory. Additionally, the computing device(s) may store metadata in second metadata files included in a second metadata buffer of the second memory, where the second metadata files correspond to the second data files.

20 Claims, 9 Drawing Sheets

US 11,782,978 B1

TECHNIQUES FOR STORING AND ANALYZING DATA

BACKGROUND

Retailers, wholesalers, and other product distributors typically maintain an inventory of various items that may be ordered, purchased, leased, borrowed, rented, viewed, and so forth, by clients or customers. For example, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate sensor data representing these events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
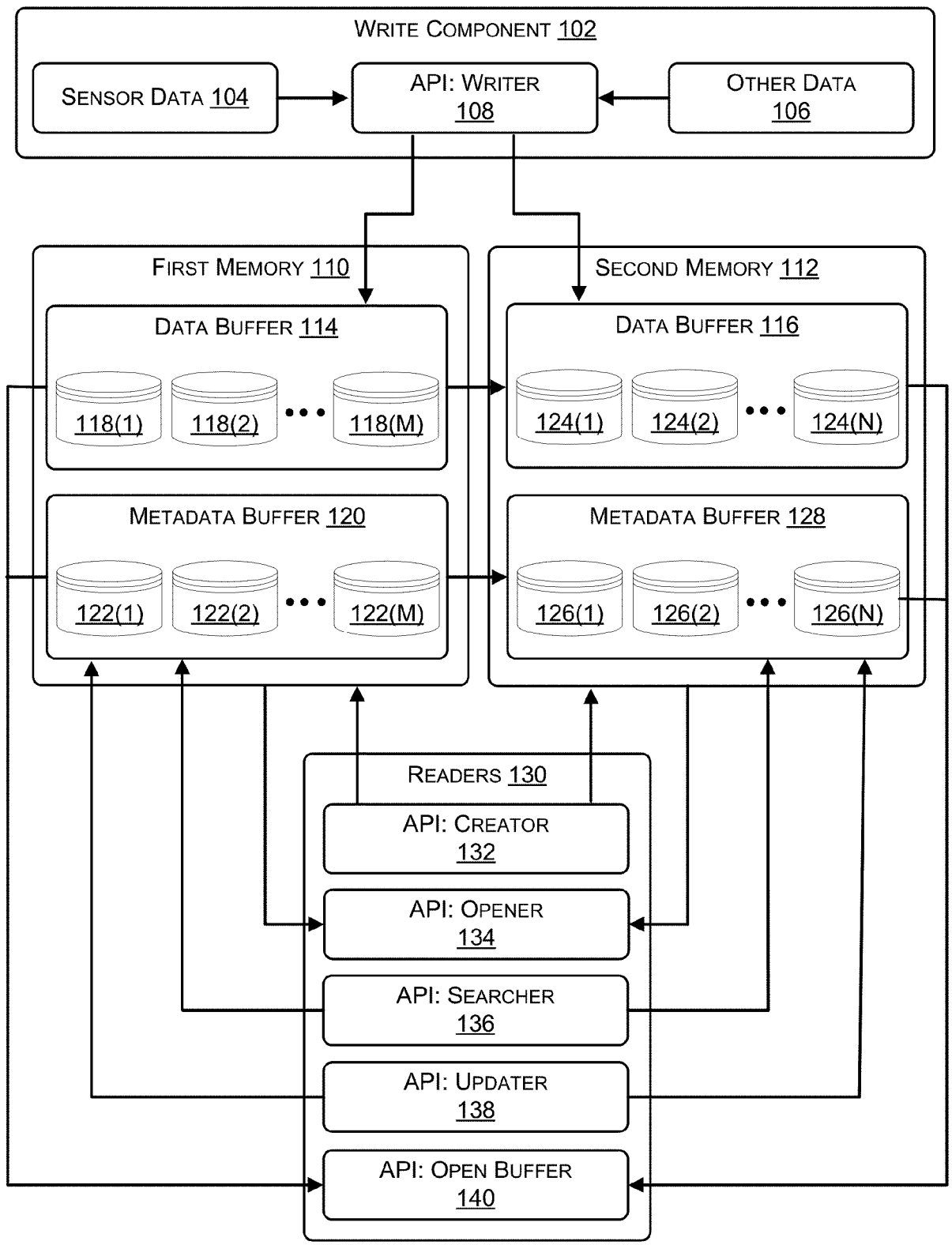
FIG. 1 illustrates an example of computing device(s) storing data using multiple memories, as well as the computing device(s) using readers to perform operations associated with the stored data.

This disclosure describes systems and techniques for storing and analyzing data. For instance, a materials handling facility (or "facility") may include one or more sensors that generate sensor data. The one or more sensors may include, but are not limited to, imaging sensors (e.g., cameras), weight sensors, light sensors, radio frequency identification (RFID) readers, touch sensors, and/or any other type of sensor that may generate sensor data. The sensor data may be analyzed in order to identify events that occur within the facility. The events may include, but are not limited to, a customer located in the facility, a customer removing an item, a customer returning an item, an employee restocking items, and/or the like. As such, it may be important for the computing system(s) associated with the facility to temporarily store the sensor data for analysis.

In some instances, the computing device(s) initially store the sensor data using a first memory. The first memory may include a cache memory (e.g., random-access memory (RAM), a temporary file storage facility, and/or some other type of volatile memory) that stores the sensor data using one or more files (referred to, in some examples, as "data files") located within a first data buffer. For example, the computing device(s) may store a first portion of the sensor data using a first data file, store a second portion of the sensor data using a second data file, store a third portion of the sensor data using a third data file, and/or so forth. In some instances, the first data buffer may include a rolling buffer (e.g., a ring buffer, a circular buffer, etc.) where, once the one or more data files are full, the computing device(s) begin to overwrite the oldest sensor data stored in the first memory. For instance, the computing device(s) may overwrite the first portion of the sensor data stored in the first data file, followed by overwriting the second portion of the sensor data stored in the second data file, and/or so forth.

In some instances, the computing device(s) store the sensor data in the one or more data files using a monotonic time system. For example, the computing device(s) may store a first portion of the sensor data generated during a first time period in the first data file, followed by storing a second portion the sensor data generated during a second, later time period in the second data file, followed by storing a third portion of the sensor data generated during a third, later time period in the third data file, and/or so forth. Again, once all of the data files are full of data, the computing device(s) may begin to overwrite the oldest sensor data stored in the one or more data files of the first memory. For example, the computing device(s) may overwrite the first portion of the sensor data stored in the first data file before overwriting the second, more recent portion of the sensor data stored in the second data file.

In some instances, the first memory may be capable of storing a specific amount of the sensor data. For instance, the first memory may be capable of storing 10 megabytes, 100 megabytes, 1 gigabyte, and/or any other amount of the sensor data. Additionally, or alternatively, in some instances, the first memory may be capable of storing a specific time interval of the sensor data. For instance, the first memory may store 2 minutes of the sensor data, 4 minutes of the sensor data, 10 minutes of the sensor data, and/or the like. Still, in some instances, the computing device(s) may segment the sensor data when storing the sensor data in the one or more data files. For example, the computing device(s) may store a first time segment of the sensor data using the first data file, a second time segment of the sensor data using the second data file, a third time segment of the sensor data using the third data file, and/or so forth. As described herein, a time segment may include, but is not limited to, 1 second, 4 seconds, 10 seconds, and/or the like of the sensor data.

For an example of storing sensor data in the first memory, if the sensor data includes video data generated by an imaging device, the computing device(s) may store a first segment of frames represented by the video data using a first data file, store a second segment of the frames represented by the video data using a second data file, store a third segment of the frames represented by the video data using a third data file, and/or so forth. In such an example, the computing device(s) may store the same number of frames in each data file. For example, if the imaging device includes a frame rate of 15 frames per second, the computing device(s) may store 60 frames in the first data file (e.g., 4 seconds of video), followed by storing the next 60 frames in the second data file, followed by storing the next 60 frames in the third data file, and/or so forth. While this is just one example of a frame rate for the imaging device and/or a number of frames that the computing device(s) may store in each of the data files, in other examples, the imaging device may include any other frame rate and/or the computing device(s) may store any number of frames in each of the data files.

The computing device(s) may further store metadata describing the sensor data, such as in a first metadata buffer of the first memory. For example, the metadata may include timestamp(s) of when the sensor data was generated, timestamp(s) of when the data files were last accessed, timestamp(s) of when the sensor data in the data files was last modified, timestamp(s) of when the metadata was last changed, an identifier of the sensor that generated the sensor data, and/or the like. In some instances, the computing device(s) store the metadata in one or more files (also referred to as "metadata files") that correspond to the one or more data files that the computing device(s) use to store the sensor data. Additionally, in such an example, the metadata files may include identifiers that correspond to the identifiers of the data files. For instance, the metadata files may include names that are similar to the names of the data files.

For example, the computing device(s) may store a first portion of the sensor data in a first data file and store first metadata in a first metadata file, where the first metadata file is associated with the first data file. The first metadata may represent at least a timestamp of when the first portion of the sensor data was generated, a timestamp of when the first data file was last accessed, a timestamp of when the first portion of the sensor data stored in the first data file was modified, and/or a timestamp of when the first metadata was last changed. The computing device(s) may further store a second portion of the sensor data in a second data file and store second metadata in a second metadata file, where the second metadata file is associated with the second data file. The second metadata may represent at least a timestamp of when the second portion of the sensor data was generated, a timestamp of when the second data file was last accessed, a timestamp of when the second portion of the sensor data stored in the second data file was modified, and/or a timestamp of when the second metadata was last changed.

In some instances, the metadata files may represent and/or include data structures, such as index nodes (inodes), that describe the data files. As described herein, an index node may include a data structure, such as in a UNIX© file system, that describes system objects such as files or a directory. For example, the index node may include attributes associated with the data file. The attributes may include, but are not limited to, a device identifier of the device storing the data file, a size of the data file, a timestamp indicating an access time (atime) of the data file, a timestamp indicating a change time (ctime) of the index file, a timestamp indicating a modify time (mtime) of the data stored in the data file, and/or the like. In some instances, the computing device(s) may modify the index nodes to include information specific to the data stored in the data file. For example, the computing device(s) may modify the timestamp indicating the modify time (mtime) to include a timestamp indicating the start time (e.g., the epoch time) of the sensor data stored in the data file.

For example, the index node may include a given number of bits (e.g., 64 bits) that are designated to the modify time. The computing device(s) may thus use a first number of the bits (e.g., 55 bits) for the modify time and a second number of the bits (e.g., 9 bits) for metadata that includes information associated with the sensor data stored in the data file. This information may include the timestamp indicating the start time of the sensor data stored in the data file.

While the above examples describe modifying the modify time (mtime) of the index nodes, in other examples, the computing device(s) may modify one or more of the other times included in the index nodes. For example, the computing device(s) may modify the access time (atime) and/or the change time (ctime) of the index nodes to include metadata associated with the sensor data that is stored in the data files.

The computing device(s) may further store the sensor data using a second memory. For example, and as discussed above, the first memory may store the sensor data in a rolling buffer of the first memory. As such, in order to store the sensor data for a longer period of time, the computing device(s) may store at least a portion of the sensor data in the second memory, which may include an archive memory (e.g., an embedded MultiMediaCard (eMMC) and/or other type of persistent memory) that stores the at least the portion of the sensor data for a longer period of time. In some instances, the second memory stores the sensor data until the computing device(s) and/or one or more other computing device(s) analyze the sensor data. In some instances, the second memory stores the sensor data for a threshold period of time. The threshold period of time may include, but is not limited to, 1 day, 3 days, 1 week, 1 month, and/or the like.

In some instances, before storing the sensor data in the second memory, the computing device(s) analyze the sensor data in order to identify portions of the sensor data that represent specific events. The specific events may include, but are not limited to, the sensor data representing a human (e.g., video data representing image frames depicting a human), the sensor data representing one or more portions of a human (e.g., video data representing image frames depicting an arm of a human), sensor data representing a customer taking an item, sensor data representing a customer returning an item, sensor data representing an employee restocking items, and/or one or more other events. The computing device(s) may then store, in the second memory, the portions of the sensor data that represent the events.

In some instances, the computing device(s) may store the sensor data in the second memory using similar techniques as the computing device(s) use to store the sensor data in the first memory. For example, the computing device(s) may store the sensor data in one or more data files located within a second data buffer (e.g., a rolling buffer, ring buffer, a circular buffer, etc.) of the second memory. The computing device(s) may store the sensor data using a monotonic time system. In some instances, the sizes of the data files of the second memory may be the same as the sizes of the data files of the first memory. For example, if a data file in the first memory stores sensor data representing a segment of time (e.g., 4 seconds), the computing device(s) may store the same segment of sensor data in a data file of the second memory. However, in other examples, the sizes of the data files of the second memory may be different than the sizes of the data files in the first memory.

In some instances, the computing device(s) may store the metadata in the second memory using similar techniques as the computing device(s) use to store the metadata in the first memory. For example, the metadata may represent and/or include data structures, such as index nodes, that describe the data files in the second memory. The metadata stored in the second memory may include similar attributes as the metadata stored in the first memory. However, since the sensor data stored in the second memory may have been accessed and/or modified after the sensor data stored in the first memory, the computing device(s) may update the data structures stored in the second memory to indicate the times of the updating and/or modifications.

In some instances, in order to store data in the memories, the computing device(s) may initially write the data to temporary files. The computing device(s) may then move the files to the memories. For a first example, the computing device(s) may write the sensor data to a temporary file. The computing device(s) may then move the temporary file to the first memory and/or or the second memory as a data file. For a second example, the computing device(s) may write the metadata to a temporary file. The computing device(s) may then move the temporary file to the first memory and/or or the second memory as a metadata file. In some instances, the computing device(s) initially write the data to temporary files in order to guarantee that all of the data is written to the memories.

In some instances, the computing device(s) store the sensor data in the memories before generating the metadata corresponding to the sensor data. For example, the computing device(s) may store sensor data in a data file of a memory (e.g., the first memory, the second memory, etc.) and, after storing the sensor data, generate the metadata corresponding to the sensor data. In some instances, by generating the metadata after the sensor data, the computing device(s) are able to ensure that the sensor data is already stored in the memories when performing one or more operations associated with the sensor data, which are described in more detail below.

In some instances, during and/or after storing the sensor data and/or the metadata in one or more of the memories, the computing device(s) may send at least a portion of the sensor data to one or more other devices. After sending the sensor data, the computing device(s) may update the metadata corresponding to the sensor data to indicate that the sensor data was sent to the one or more other devices. For example, if the metadata includes a data structure, the computing device(s) may update a portion of the data structure to indicate that the sensor data was sent to the one or more other devices. More specifically, if the data structure includes an index node, updating the index node may include updating one or more bits of the index node, such as the one or more bits included in the portion of the index node that is associated with the modify time (e.g., the second number of bits described in the example above).

In some instances, the computing device(s) may further receive requests for accessing the sensor data. For example, the computing device(s) may receive, from a device, a request for sensor data. The request may include, but is not limited to, an identifier of a sensor, a type of the sensor data, a time (and/or time range) associated with the sensor data, and/or the like. The computing device(s) may then use the request to search for the sensor data. In some instances, such as when the first memory and/or the second memory include index nodes, the first memory and/or the second memory may include directories that include information about the index nodes. The information may include, but is not limited to, names of the index nodes, pointers (e.g., i-numbers) indicating locations of the index nodes, and/or the like.

The computing device(s) may then use the directories to search for the sensor data. For example, the computing device(s) may use the directories to identify one or more index nodes that include timestamps corresponding to the time (and/or time range) indicated by the request. The computing device(s) may then use the one or more index nodes to identify the corresponding one or more data files that include the sensor data. In some instances, by using the directories to perform the search, the computing device(s) may reduce the amount of time it takes to identify the sensor data. This may be because the computing device(s) are not required to open/close separate files when performing the search, which may take time and/or computing resources. Rather, the computing device(s) analyze the information included in the directories.

Additionally, and since the data files may be stored using the monotonic time system, the computing device(s) may be able to quickly identify the sensor data using the timestamps represented by the directories and/or index nodes. For example, the computing device(s) may analyze the timestamps (e.g., the modified mtimes) indicating when the sensor data was generated starting at a first index node in the memory and then advancing through the data index nodes to the last index node in the memory. The computing device(s) may perform this until the computing device(s) determine that the time represented by the request is between a timestamp represented by an index node and a timestamp represented by a next index node. The computing device(s) may then determine that the data file corresponding to the index node includes the requested senor data. In some instances, this type of searching may include a binary search through the index nodes.

In some instances, the computing device(s) initially search through the first memory before searching through the second memory for the sensor data. For example, the computing device(s) may search through the directories of the first memory to determine if the sensor data is still stored in the first memory. If the computing device(s) determine that the sensor data is still stored in the first memory, then the computing device(s) may retrieve the sensor data from the first memory and send the sensor data to the device. However, if the computing device(s) determine that the sensor data is no longer stored in the first memory (e.g., the sensor data was overwritten), then the computing device(s) may search through the directories of the second memory to determine if the sensor data is still stored in the second memory. If the computing device(s) determine that the sensor data is still stored in the second memory, then the computing device(s) may retrieve the sensor data from the second memory and send the sensor data to the device.

In some instances, the computing device(s) may utilize memory pairs for various sensors and/or various types of sensor data generated by a sensor. For example, the computing device(s) may utilize a first memory pair, which includes at least two memories similar to the memories described above, to store sensor data generated by a first imaging device. Additionally, the computing device(s) may utilize a second memory pair, which includes at least to memories similar to the memories described above, to store sensor data generated by a second imaging device. However, in other examples, the computing device(s) may use the same memory pair to store sensor data generated by more than one sensor.

In some instances, when the computing device(s) are performing one or more operations associated with the sensor data, such as when a directory associated with the sensor data and/or corresponding metadata is being accessed, the computing device(s) may continue to access the sensor data even when the sensor data is overwritten in the first memory and/or the second memory. For instance, if the computing device(s) are accessing sensor data stored in a data file and, while accessing the sensor data, the sensor data is overwritten within the data file, the computing device(s) may still have access to the sensor data. This way, the computing device(s) may be able to finish any operations on the sensor data without the sensor data being deleted.

In some instances, the computing device(s) may use the monotonic time system to determine which data file to begin storing sensor data. For instance, the computing device(s) may analyze the metadata files (e.g., the index nodes) and, based at least in part on the analysis, identify the timestamps indicating when the sensor data generated in the corresponding data files was generated. The computing device(s) may continue this analysis until the computing device(s) identify that a timestamp included in a metadata file is prior in time to a timestamp included in a previous metadata file. The computing device(s) may then select the data file, which corresponds to the metadata file with the prior time, as the first data file for storing sensor data. This may be because the selected data file includes the oldest generated sensor data in the data files.

The techniques may be performed by one or more back-end devices or servers associated with the facility. For instance, the sensor data and/or image data may be collected by sensors in the facility and sent over network(s) to back-end devices at the facility, or server devices located remote from the facility, to be processed remotely. Further, while various techniques described below are with reference to purchasing items in a retail facility, the techniques are generally applicable to any materials handling facility in which a user may take items from the facility or move items around the facility. For example, although the techniques described herein are primarily with reference to identifying items taken by a user for the purpose of identifying a user account to charge for items selected from a materials handling facility, the techniques are equally applicable to any industry in which user recognition may be helpful. For instance, the item-identifying tote may be implemented for distribution centers where employees collect items from various locations to be shipped through the mail system.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example of computing device(s) storing data using multiple memories, as well as the computing device(s) using readers to perform operations associated with the stored data. As shown, a write component 102 may receive both system sensor data 104 and other data 106 (e.g., application data). The write component 102 may then use an application programming interface (API) writer 108 to write the data in a first memory 110 and/or a second memory 112. In some instances, the first memory 110 may include a cache memory and the second memory 112 may include an archive memory.

For example, the first memory 110 may include, but is not limited to, RAM, a temporary file storage facility, and/or some other type of volatile memory. In the example of FIG. 1, the first memory 110 may include a rolling data buffer 114 that stores a set amount of the data. In some instances, the set amount of data may include, but is not limited to, 10 megabytes, 100 megabytes, 1 gigabyte, and/or any other amount of the data. Additionally, or alternatively, in some instances, such as when the data includes the sensor data 104, the set amount of data may include, but is not limited to, 2 minutes of the data, 4 minutes of the data, 10 minutes of the data, and/or the like.

Additionally, the second memory 112 may include, but is not limited to, an eMMC and/or other type of persistent memory. In the example of FIG. 1, the second memory 112 may include a rolling data buffer 116 that stores a set amount of data. In some instances, the set amount of data may include, but is not limited to, 1 gigabyte, 10 gigabytes, 100 gigabytes, and/or any other amount of the data. Additionally, or alternatively, in some instances, such as when the data includes the sensor data 104, the set amount of data may include, but is not limited to, 1 day of data, 3 days of data, 1 week of data, and/or the like. In other words, the data buffer 116 of the second memory 112 may store more data than the data buffer 114 of the first memory 110.

To write the data in the first memory 110, the write component 102 may store the data in data files 118(1)-(M) of the data buffer 114. For example, the write component 102 may segment the data into different time segments (e.g., 4 second segments). The write component 102 may then store a first segment of the data in the first data file 118(1), store the second segment of the data in the second data file 118(2), and/or so forth until the last data file 118(M) of the data buffer 114 is full. If the last data file 118(M) is full and the write component 102 continues to receive additional data, the write component 102 may begin to overwrite the oldest data stored in the data buffer 114. For example, after writing data to the last data file 118(M), the write component 102 may overwrite the data stored in the first data file 118(1) with new data. The write component 102 may continue this process as the write component 102 continues to receive the data.

In some instances, after writing the data to the data buffer 114, the computing device(s) (e.g., the write component 102) may write metadata to a metadata buffer 120 of the first memory 110. The metadata buffer 120 may include metadata files 122(1)-(M) that correspond to the data files 118(1)-(M). For example, after writing the data to the first data file 118(1), the computing device(s) may write metadata to the first metadata file 122(1), where the metadata written to the first metadata file 122(1) describes the first data file 118(1). For another example, after writing the data to the second data file 118(2), the computing device(s) may write metadata to the second metadata file 122(2), where the metadata written to the second metadata file 122 (2) describes the second data file 118(2).

In some instances, the metadata may include index nodes that describe the data files 118(1)-(M). For example, the metadata written to the first metadata file 122(1) may include an index node that includes attributes associated with the first data file 118(1). As described herein, the attributes may include, but are not limited to, a device identifier of the device storing the first data file 118(1), a size of the first data file 118(1), a timestamp indicating an access time (atime) of the first data file 118(1), a timestamp indicating a change time (ctime) of the first metadata file 122(1), a timestamp indicating a modify time (mtime) of the data stored in the first data file 118(1), and/or the like. In some instances, the computing device(s) may modify the index nodes to include information specific to the data stored in the first data file 118(1). For example, the computing device(s) may modify the timestamp indicating the modify time (mtime) to include the start time (e.g., the epoch time) of the data stored in the first data file 118(1).

In some instances, and since the metadata files 122(1)-(M) correspond to the data files 118(1)-(M), the computing device(s) may overwrite the metadata stored in the metadata files 122(1)-(M) when overwriting the data in the corresponding data files 118(1)-(M). For example, if the computing device(s) overwrite the data stored in the first data file 118(1), the computing device(s) may overwrite the metadata stored in the first metadata file 122(1). Overwriting the metadata may include at least updating one or more of the timestamps included in the metadata. For example, overwriting the metadata may include updating a timestamp to indicate the new access time (atime) of the first data file 118 (1), updating a timestamp to indicate the new change time (ctime) of the first metadata file 122(1), and/or updating a timestamp to indicate the new modify time (mtime) of the data stored in the first data file 118(1).

For an example of writing data to the first memory 110, the write component 102 may be writing video data into the first memory 110. For instance, the write component 102 may write a first segment of frames (e.g., 60 frames) of the video data into the first data file 118(1), a second segment of frames (e.g., 60 frames) of the video data into the second data file 118(2), and/or so forth until the write component 102 writes a last segment of frames (e.g., 60 frames) of the video data into the last data file 118(M). The write component 102 may write the video data using a monotonic time system, such as the second set of frames occurs directly after the first set of frames. Additionally, if the write component 102 continues to receive additional video data, the write component 102 will then start to overwrite the oldest video data stored in the data buffer 114, such as starting at the first data file 118(1).

The computing device(s) may also be writing the metadata to the metadata buffer 120 while writing the video data to the data buffer 114. For example, after writing the first segment of frames to the first data file 118(1), the computing device(s) may write first metadata to the first metadata file 122(1). The first metadata may include attributes associated with the first data file 118(1). Additionally, after writing the second segment of frames to the second data file 118(2), the computing device(s) may write second metadata to the second metadata file 122(2). The second metadata may include attributes associated with the second data buffer 118(2). The computing device(s) may continue this process while writing the data to the data buffer 114.

In some instances, the write component 102 may perform similar processes to write the data to data files 124(1)-(N) included in the data buffer 116 of the second memory 112. Additionally, the computing device(s) and/or the write component 102 may perform similar processes to write the metadata in the corresponding metadata files 126(1)-(N) included in a metadata buffer 128 of the second memory 112. However, and as shown in the example of FIG. 1, the data buffer 116 may include more data files 124(1)-(N) than the data buffer 114. In some instances, and as described herein, this may be because the second memory 112 is capable of storing more data than the first memory 110. For instance, the first memory 110 may store a first amount of the data in the first data buffer 114 (e.g., 2 minutes) while the second memory 112 stores a second amount of the data in the second data buffer 116 (e.g., 3 days).

In some instances, the computing device(s) (e.g., an API persist, which may be represented by the arrow from the data buffer 114 to the data buffer 116) may write the data stored in the data buffer 114 to the data buffer 116. For instance, the API persist may copy one or more of the data files 118(1)-(M) and then move the one or more copied files to the data buffer 116. When writing the data from the data buffer 114, the computing device(s) may write the data that represents specific events. For example, if the computing device(s) determine that the data stored in the first data file 118(1) represents a human, then the computing device(s) may write the data to a data file (e.g., the first data file 124 (1)) of the data buffer 116.

Additionally, the computing device(s) (e.g., an API persist, which may be represented by the arrow from the metadata buffer 120 to the metadata buffer 128) may write the corresponding metadata, which is stored in the first metadata file 122(1), to a metadata file (e.g., the first metadata file 126 (1)) of the metadata buffer 128. This way, the computing device(s) may store data that represents specific events for a longer period of time. To write the data, the API persist may copy the metadata stored in one or more of the metadata files 112(1)-(M) and then move the one or more copied files to the metadata buffer 128.

As further illustrated in the example of FIG. 1, the computing device(s) may include readers 130 that read data from the first memory 110 and/or the second memory 112. In some instances, the readers 130 may read the data included in the metadata buffer 120 and/or metadata buffer 128 in order to reduce the amount of time it takes to performs one or more operations. This may be because the metadata files 122(1)-(M) and/or the metadata files 126(1)-(N) include index nodes and/or directories, which the computing device(s) are able to quickly search. More specifically, the computing device(s) may not be required to open and close separate files when searching the index nodes and/or directories, which may be in contrast to searching the data stored in the data files 118(1)-(M) and/or the data files 124(1)-(N).

As shown, the readers 130 may include at least an API creator 132, an API opener 134, an API searcher 136, an API updater 138, and an API open buffer 140. The API creator 132 may be configured to initiate a memory buffer pair. For example, if a new sensor begins generating sensor data, the API creator 132 may create a data buffer within a first memory and a corresponding data buffer within a second memory, similar to the data buffer 114 within the first memory 110 and the corresponding data buffer 116 within the second memory 112.

The API opening 134 may be configured to load buffer instances for use by other API operations. For instance, the API opening 134 may load the first data file 118(1) and the corresponding first metadata file 122(1) for use by other API operations. The API searcher 136 may be configured to perform one or more of the searching operations described herein. For instance, the API searcher 136 may be configured to find a list of buffers (e.g., data files, metadata files, etc.) that are within a given time range indicated by a search request.

The API updater 138 may be configured to update the metadata stored in the metadata files 122(1)-(M) and/or the metadata files 126(1)-(N). For instance, when the data files 118(1)-(M) and/or the data files 124(1)-(N) are updated, accessed, and/or modified, the API updater 138 may update the corresponding metadata to reflect the updates, accesses, and/or modifications. Additionally, the API open buffer 140 may be configured to open a buffer for reading or writing.

It should be noted that, in some instances, at least a portion of the data (e.g., the sensor data 104, the other data, etc.) may be formatted to the sensor that is generating the data. For instance, a manufacturer and/or producer of the sensor may cause the sensor to output the data in a format that is specific to the sensor (e.g., the sensor includes hardware that formats the sensor data). Additionally, in some instances, the computing device(s) may be configured to format the data into one or more selected formats.

Figure 2:
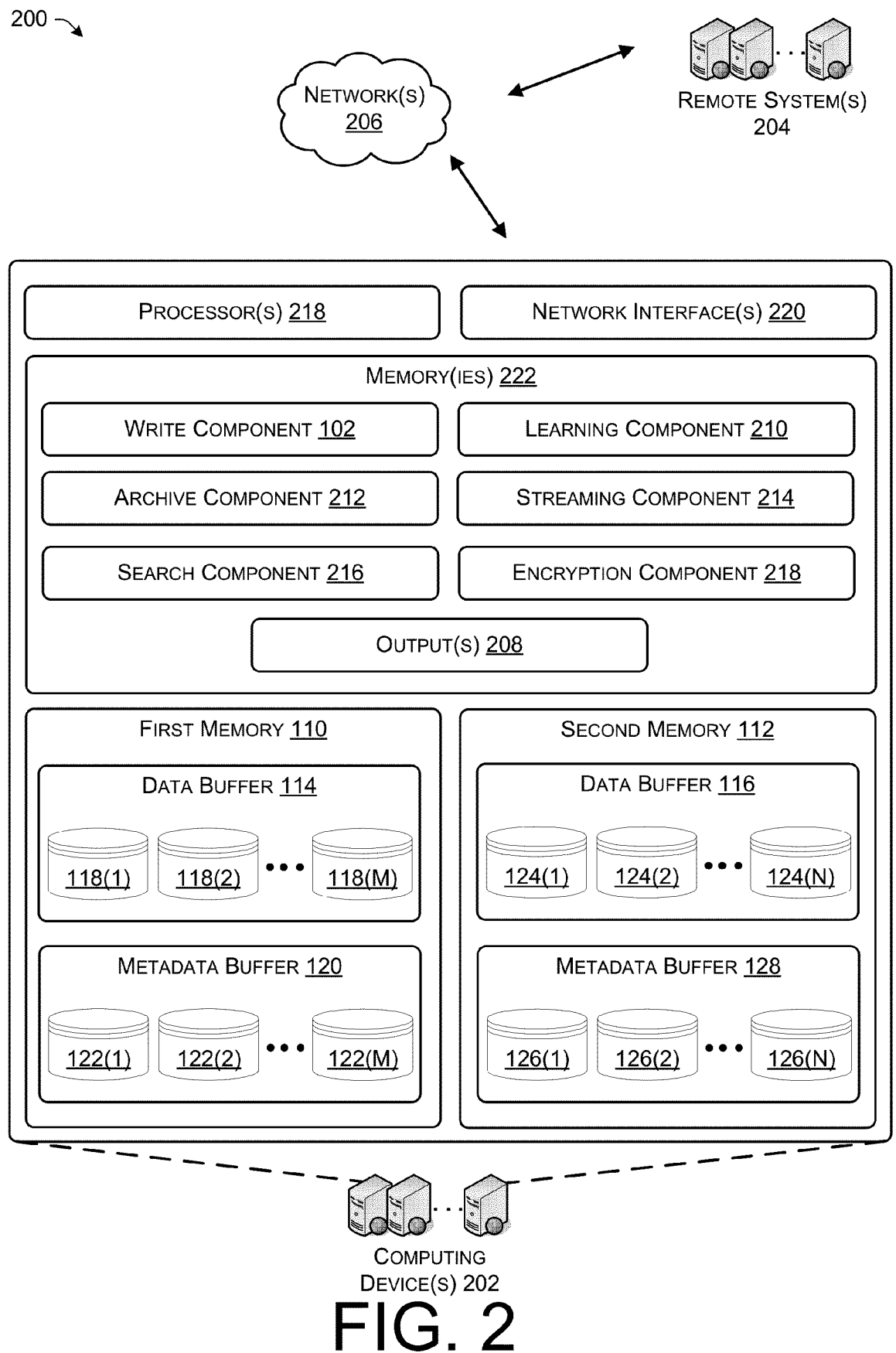
FIG. 2 illustrates an example environment that includes computing device(s) storing data using multiple memories, as well as the computing device(s) sending the data to remote system(s).

FIG. 2 illustrates an example environment 200 that includes computing device(s) 202 storing data using multiple memories, as well as the computing device(s) 202 sending the data to remote system(s) 204 over network(s) 206. As shown, the computing device(s) 202 may store the first memory 110 and the second memory 112. Although the example of FIG. 2 illustrates the computing device(s) 202 as only storing a single first memory and a single second memory, in other examples, the computing device(s) 202 may store any number of first memory and second memory pairs. For example, the computing device(s) 202 may store first memory and second memory pairs for different output(s) 208 (e.g., sensor(s) and/or other device(s) that generate/output data), different types of sensor data, and/or the like.

As shown, the computing device(s) 202 may include the write component 102, a learning component 210, an archive component 212, a streaming component 214, a search component 216, and an encryption component 218. The learning component 210 may be configured to analyze the data stored in the data files 118(1)-(M) using one or more image processing and/or object recognition techniques. Based at least in part on the analysis, the learning component 210 is configured to determine if the data represents an event. As described herein, the learning component 210 may determine that the data represents the event when the data represents a human (e.g., video data representing image frames depicting a human), the data represents one or more portions of a human (e.g., video data representing image frames depicting an arm of a human), the data represents a customer taking an item, the data represents a customer returning an item, the data represents an employee restocking items, and/or the like.

In some instances, the learning component 210 may send, to at least the archive component 212, a request to not archive the data when the data does not represent an event. Additionally, or alternatively, in some instances, the learning component 210 may send, to at least the archive component 212, a request to archive the data when the data does represent an event. The archive component 212 will then use the requests to determine which data to store in the second memory 112.

For instance, the archive component 212 may be configured to archive the data that represents the events. To archive the data, the archive component 212 may write the data to the data files 124(1)-N) of the second memory 112 and/or write the metadata to the metadata files 126(1)-(N) of the second memory 112. As described herein, the second memory 112 may store the data for a longer period of time than the first memory 110. In some instances, the archive component 212 may be configured to archive the data when the archive component 212 does not receive the request from the learning component 210. As such, even if the learning component 210 is not operating properly, the default of the archive component 212 is to archive the data. However, in other instances, the archive component 212 may be configured to archive the data when the archive component 212 receives the request to archive the data.

The streaming component 214 may be configured to cause the computing device(s) 202 to send the data (and/or the metadata) to the remote system(s) 204. In some instances, the streaming component 214 may cause the computing device(s) 202 to send all of the data (and/or the metadata) to the remote system(s) 204. In some instances, the streaming component 214 may cause the computing device(s) 202 to send all of the data representing the events (and/or the corresponding metadata) to the remote system(s) 204. Still, in some instances, the streaming component 214 may cause the computing device(s) 202 to send requested data (and/or the corresponding metadata) to the remote system(s) 204.

As described herein, the computing device(s) may update the metadata to indicate which data was sent to the remote system(s) 204. As such, the streaming component 214 may analyze the metadata to determine which data still needs to be sent to the remote system(s) 204. This way, the streaming component 214 may not cause the computing device(s) 202 to send the same data to the remote system(s) 204 multiple times.

The search component 216 may be configured to search for data when receiving requests from the remote system(s) 204. As described herein, the search component 216 may search for the data using the metadata (e.g., directories, index nodes, etc.) stored in the metadata files 122(1)-(M) and/or the metadata files 126(1)-(N). Additionally, the search component 216 may initially search through the first memory 110 for the data. If the search component 216 determines that the data is still stored in the first memory 110, then the streaming component 214 may cause the computing device(s) 202 to send the data, from the first memory 110, to the remote system(s) 204.

However, if the search component 216 determines that the data is no longer stored in the first memory 110, then the search component 216 may search through the second memory 112 for the data. If the search component 216 determines that the data is still stored in the second memory 112, then the streaming component 214 may cause the computing device(s) 202 to send the data, from the second memory 112, to the remote system(s) 204. However, if the search component 216 determines that the data is no longer stored in the second memory 112, then the computing device(s) 202 may notify the remote system(s) 204 that the computing device(s) 202 are no longer storing the data.

The encryption component 218 may be configured to encrypt data using one or more encryption techniques. For example, the encryption component 218 may encrypt the sensor data in order to generate encrypted sensor data and/or encrypt the metadata in order to generate encrypted metadata. The computing device(s) 202 may then store the encrypted sensor data and/or the encrypted metadata in the first memory 110 and/or the second memory 112.

As further illustrated in the example of FIG. 2, the computing device(s) 202 includes processor(s) 218, network interface(s) 220, and memory(ies) 222. As used herein, a processor, such as the processor(s) 218, may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Additionally, memory, such as the memory(ies) 222, may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s), such as the network interface(s) 220, may enable messages between devices, such as the computing device(s) 202, the remote system(s) 204, and/or with one or more other remote systems, as well as other networked devices. The network interface(s) may include one or more network interface controllers (NICs) or other types of transceiver devices to send and receive messages over the network(s) 206. For instance, each of the network interface(s) may include a personal area network (PAN) component to enable messages over one or more short-range wireless message channels. For instance, the PAN component may enable messages compliant with at least one of the following standards IEEE 802.14.4 (ZigBee), IEEE 802.14.1 (Bluetooth), IEEE 802.11 (WiFi), or any other PAN message protocol. Furthermore, each of the network interface(s) may include a wide area network (WAN) component to enable message over a wide area network.

Figure 3:
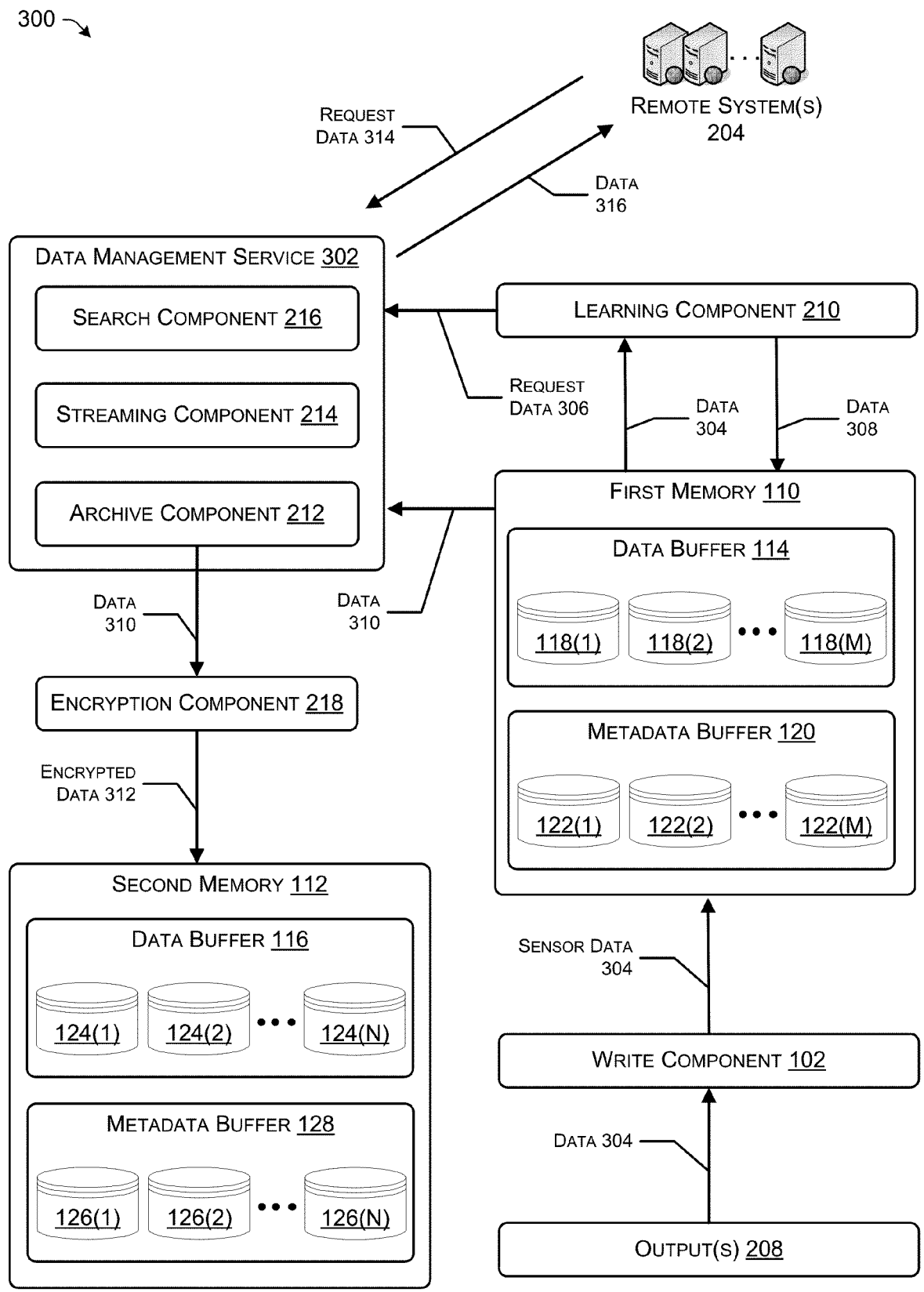
FIG. 3 illustrates an example environment that includes various components of the computing device(s) communicating in order to store data in memories as well as analyze the data stored in the memories.

FIG. 3 illustrates an example environment 300 that includes various components of the computing device(s) 202 communicating in order to store data in memories as well as analyze the data stored in the memories. In the example of FIG. 3, the environment 300 may include a data management service 302. The data management service 302 may store the archive component 212, the streaming component 214, and/or the search component 216.

As shown, the output(s) 208 may send data 304 (e.g., sensor data) to the write component 102. The write component 102 may then write the data 304 into the data files 118(1)-(M) within the data buffer 114 of the first memory 110. Additionally, the computing device(s) 202 may write the metadata in the metadata files 122(1)-(M) within the metadata buffer 120 of the first memory 110.

The learning component 210 may retrieve the data 304 from the data files 118(1)-(M) of the first memory 110 and/or the metadata from the metadata files 122(1)-(M). The learning component 210 may then analyze the data 304 in order to determine whether portions of the data 304 represent one or more events. In some instances, when the learning component 210 determines that a portion of the data 304 does not represent an event, the learning component 210 may send, to the data management service 302, request data 306 that represents a request to not archive the portion of the data 304. Additionally, or alternatively, in some instances, when the learning component 210 determines that a portion of the data 304 represents an event, the learning component 210 may send, to the data management service 302, request data 306 that represents a request to archive the portion of the data 304.

In some instances, the learning component 210 may further write data 308 into the first memory 110. For example, the learning component 210 may write data representing the results of the analysis into the first component 308.

The archive component 212 may retrieve the portions of the data 304 that represent the events (which is represented by "data 310") from the first memory 110 and/or the portions of the metadata that correspond to the data 310. The archive component 212 may then write the data 310 into the data files 124(1)-(N) within the data buffer 116 of the second memory 112. Additionally, the computing devices 202 (e.g., the archive component 212) may write the corresponding metadata into the metadata files 126(1)-(N) within the metadata buffer 128 of the second memory 112.

In some instances, and as illustrated in the example of FIG. 3, the encryption component 218 may first encrypt the data 310 in order to generate encrypted data 312. The data management service 302 may then store the encrypted data 312 in the data files 124(1)-(N) within the data buffer 116 of the second memory 112. Additionally, in some instances, the encryption component 218 may first encrypt the metadata to generate encrypted metadata. The computing devices 202 (e.g., the archive component 212) may then write the encrypted metadata into the metadata files 126(1)-(N) within the metadata buffer 128 of the second memory 112.

As further illustrated in the example of FIG. 3, the data management service 302 may receive request data 314 from the remote system(s) 204. The request data 314 may represent requests for portions of the data 304. For example, the request data 312 may include an identifier of a output 208, a type of the data 304, a time (and/or time range) associated with the data 304, and/or the like. The search component 216 may then use one or more of the processes described herein to retrieve the requested data (which is represented by "data 316") from the first memory 110 and/or the second memory 112. Additionally, the data management service 302 may send the data 316 to the remote system(s) 204.

In some instances, the data 316 sent to the remote system(s) 204 may be encrypted. For example, if the data management service 302 is sending the encrypted data 312 stored in the second memory 112, then the data management service 302 may retrieve the encrypted data 312 from the second memory 112 and then send the encrypted data 312 (which may be represented by the data 316) to the remote system(s) 204. In other instances, the data 316 sent to the remote system(s) 204 may not be encrypted. For example, and again if the data management service 302 is sending the encrypted data 312 stored in the second memory 112, then the data management service 302 may retrieve the encrypted data 312 from the second memory 112 and decrypt the encrypted data 312 (e.g., using the encryption component 218) in order to generate the data 316. The data management service 302 may then send the data 316 to the remote system(s) 204.

FIGS. 4A-6 illustrate various processes for storing data in memories. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 4A:
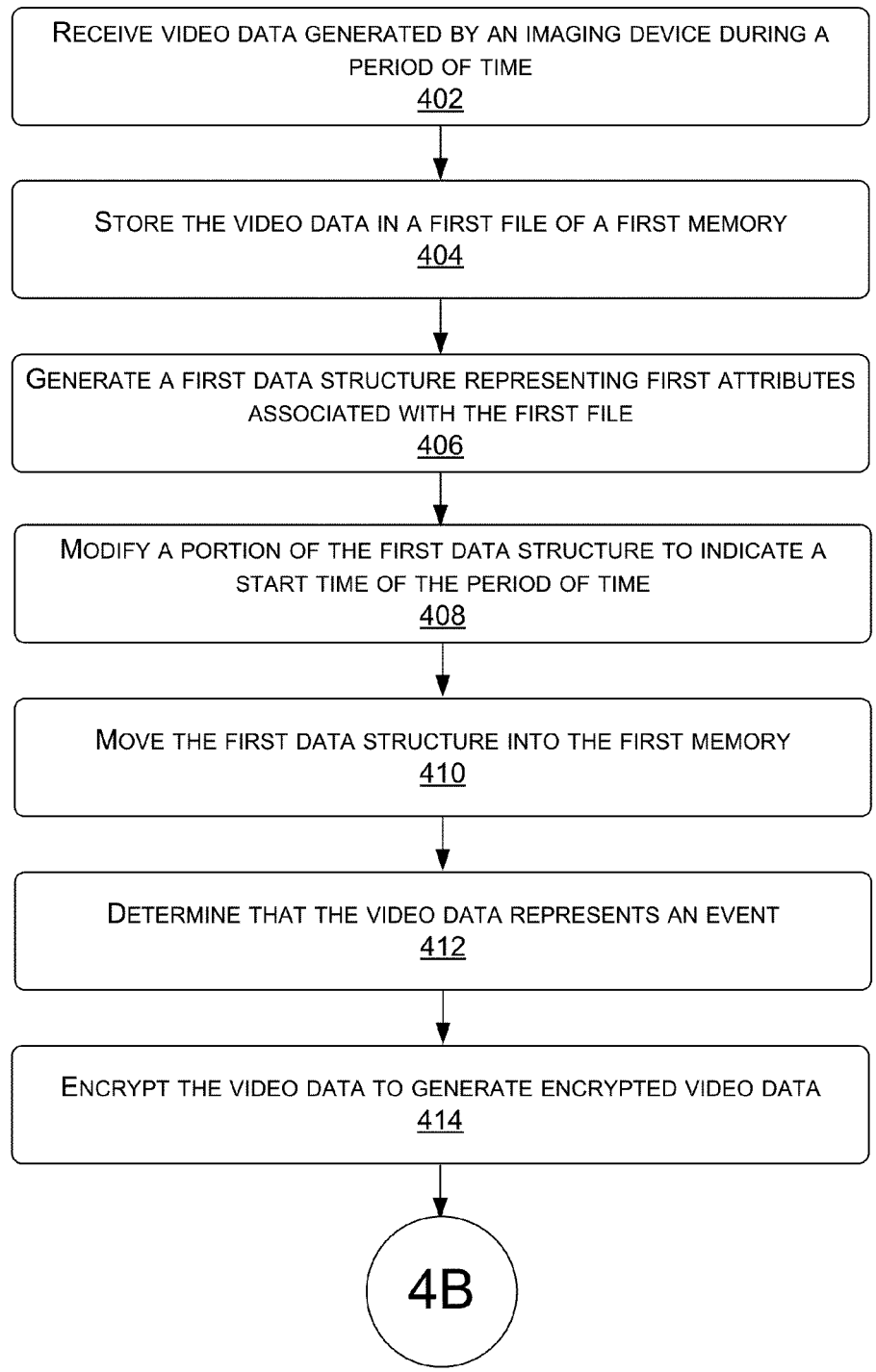
FIGS. 4A-4B are an example process for storing video data in at least a first memory and a second memory.
Figure 4B:
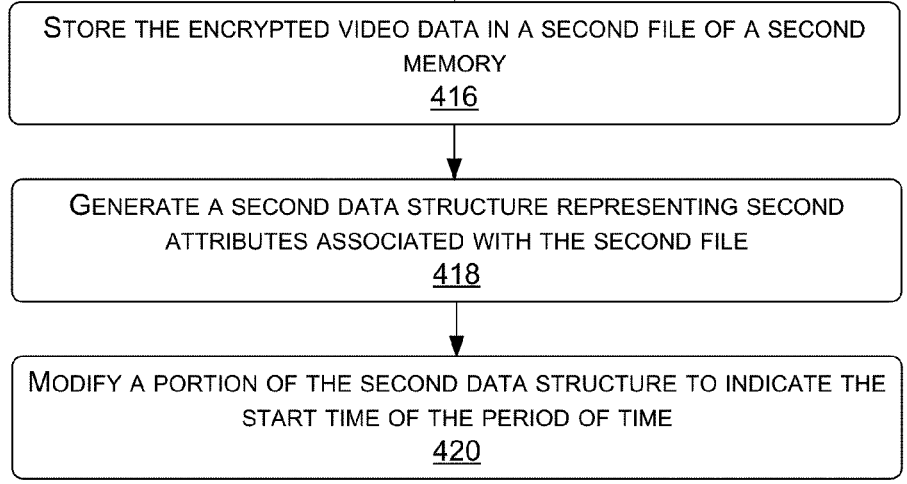

FIGS. 4A-4B is an example process 400 for storing video data in at least a first memory and a second memory. At operation 402, the process 400 may include receiving video data generated by an imaging device during a period of time and at operation 404, the process 400 may include storing the video data in a first file of a first memory. For instance, the computing device(s) 202 may receive the video data from the imaging device. The video data may represent frames generated by the imaging device during the period of time. The computing device(s) 202 may then store the frames in the first file of the first memory. As described herein, the first memory may include a cache memory (e.g., RAM, a temporary file storage facility, and/or some other type of volatile memory).

At operation 406, the process 400 may include generating a first data structure representing first attributes associated with the first file. For instance, after storing the frames in the first file, the computing device(s) 202 may generate the first data structure. As described herein, the first data structure may include a first index node associated with the first file. For instance, the first index node may include the first attributes associated with the first file. The first attributes may include, but are not limited to, a timestamp indicating an access time (atime) of the first file, a timestamp indicating a change time (ctime) of the first index node, a timestamp indicating a modify time (mtime) of the first video files stored in the first file, and/or the like.

At operation 408, the process 400 may include modifying a portion of the first data structure to indicate a start time of the period of time and at operation 410, the process 400 may include moving the first data structure into the first memory. For instance, the computing device(s) 202 may modify the first index node, such as the portion of the first index node associated with the mtime, to include a timestamp indicating the start time (e.g., the epoch time) of the first period of time. After modifying the first index node, the computing device(s) 202 may move the first index node into the first memory.

At operation 412, the process 400 may include determining that the video data represents an event. For instance, the computing device(s) 202 may analyze the frames stored in the first file of the first memory. Based at least in part on the analysis, the computing device(s) 202 may determine that the frames represent the event.

At operation 414, the process 400 may include encrypting the video data to generate encrypted video data. For instance, based at least in part on determining that the frames represent the event, the computing device(s) 202 may determine to archive the frames. As such, the computing device(s) 202 may initially encrypt the video data to generate the encrypted video data.

At operation 416, the process 400 may include storing the encrypted video data in a second file of a second memory. For instance, the computing device(s) 202 may store the encrypted video data representing the encrypted frames in the second file of the second memory. As described herein, the second memory may include an archive memory (e.g., an eMMC and/or other type of persistent memory).

At operation 418, the process 400 may include generating a second data structure representing second attributes associated with the second file. For instance, after storing the encrypted video data in the second file, the computing device(s) 202 may generate the second data structure. As described herein, the second data structure may include a second index node associated with the second file. For instance, the second index node may include the second attributes associated with the second file. The second attributes may include, but are not limited to, a timestamp indicating an access time (atime) of the second file, a timestamp indicating a change time (ctime) of the second index node, a timestamp indicating a modify time (mtime) of the encrypted video data stored in the second file, and/or the like.

At operation 420, the process 400 may include modifying a portion of the second data structure to indicate the start time of the period of time and at operation 422, the process 400 may include moving the second data structure into the second memory. For instance, the computing device(s) 202 may modify the second index node, such as the portion of the second index node associated with the mtime, to include a timestamp indicating the start time (e.g., the epoch time) of the period of time. After modifying the second index node, the computing device(s) 202 may move the second index node into the second memory.

Figure 5:
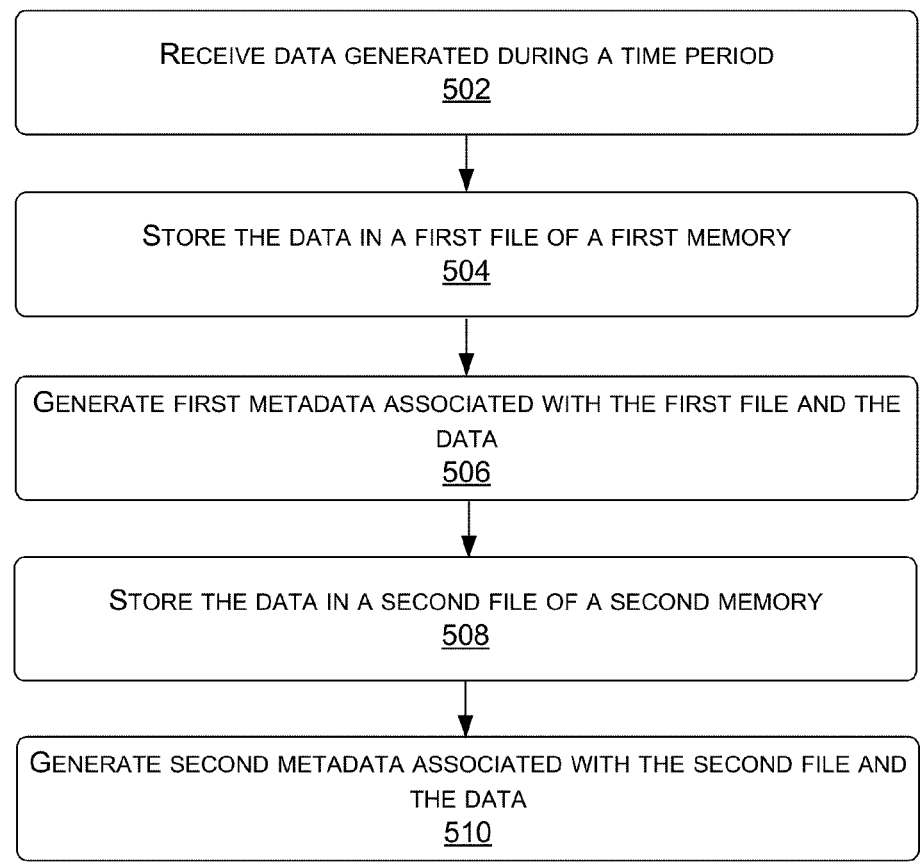
FIG. 5 is an example process for storing data in multiple memories.

FIG. 5 is an example process 500 for storing data in multiple memories. At operation 502, the process 500 may include receiving data generated during a period of time and at operation 504, the process 500 may include storing the data in a first file of a first memory. For instance, the computing device(s) 202 may receive the data. The computing device(s) 202 may then store the data in the first file of the first memory. As described herein, the first memory may include a cache memory (e.g., RAM, a temporary file storage facility, and/or some other type of volatile memory).

At operation 506, the process 500 may include generating first metadata associated with the first file and the data. For instance, after storing the data in the first file, the computing device(s) 202 may generate the first metadata. The first metadata may include, but is not limited to, a timestamp indicating an access time (atime) of the first file, a timestamp indicating a change time (ctime) of the first metadata, a timestamp indicating a modify time (mtime) of the data stored in the first file, and/or a timestamp indicating the start time (e.g., the epoch time) of the period of time.

At operation 508, the process 500 may include storing the data in a second file of a second memory. For instance, the computing device(s) 202 may store the data in the second file of the second memory. In some instances, the computing device(s) 202 store the data in the second file based at least in part on determining that the data represents an event. As described herein, the second memory may include an archive memory (e.g., an eMMC and/or other type of persistent memory).

At operation 510, the process 500 may include generating second metadata associated with the second file and the data. For instance, after storing the data in the second file, the computing device(s) 202 may generate the second metadata. The second metadata may include, but is not limited to, a timestamp indicating an access time (atime) of the second file, a timestamp indicating a change time (ctime) of the second metadata, a timestamp indicating a modify time (mtime) of the data stored in the second file, and/or a timestamp indicating the start time (e.g., the epoch time) of the period of time.

Figure 6:
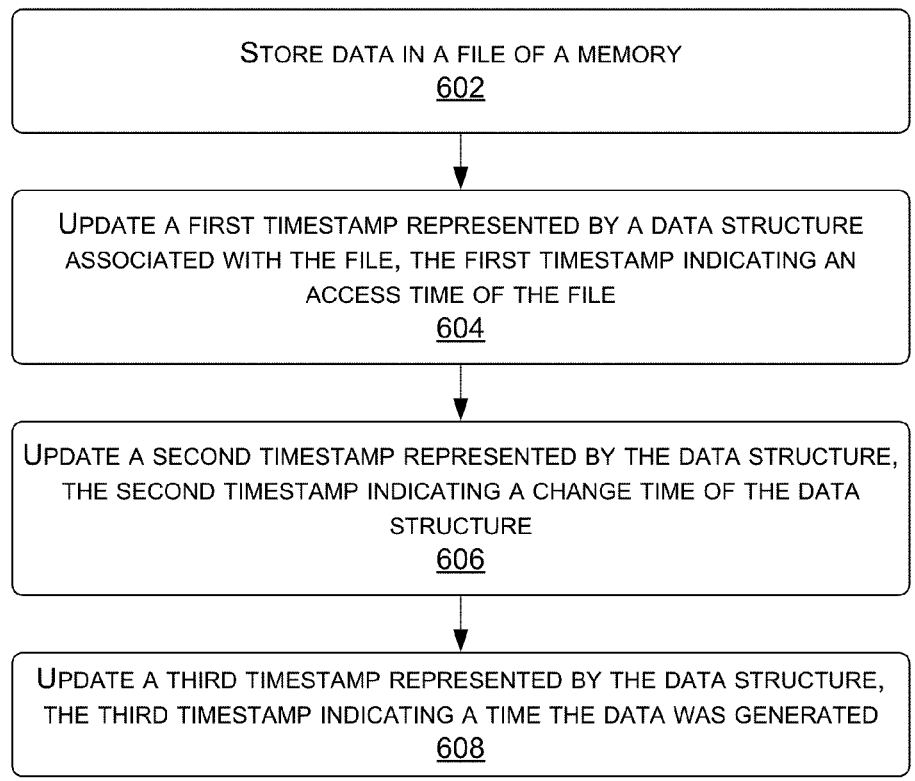
FIG. 6 is an example process of generating a data structure associated with both a file and data stored in the file.

FIG. 6 is an example process 600 of generating a data structure associated with a file and data stored in the file. At operation 602, the process 600 may include storing data in a file of a memory. For instance, the computing device(s) 202 may store the data in the file of the memory. In some instances, the memory may include a cache memory (e.g., RAM, a temporary file storage facility, and/or some other type of volatile memory). In other instances, the memory may include an archive memory (e.g., an eMMC and/or other type of persistent memory).

At operation 604, the process 600 may include updating a first timestamp represented by a data structure associated with the file, the first timestamp indicating an access time of the file. For instance, after storing the data, the computing device(s) may update the first timestamp to indicate the access time of the file. The access time may indicate the last time that the file was accessed by a device.

At operation 606, the process 600 may include updating a second timestamp represented by the data structure, the second timestamp indicating a change time of the data structure. For instance, the computing device(s) may update the second timestamp to indicate the change time of the data structure. The change time may indicate the last time that the data structure was updated.

At operation 608, the process 600 may include updating a third timestamp represented by the data structure, the third timestamp indicating a time the data was generated. For instance, the computing device(s) may modify the portion of the data structure that is associated with the modify time of the file. For example, the computing device(s) may modify the portion of the data structure to indicate a time at which the data was generated.

Figure 7:
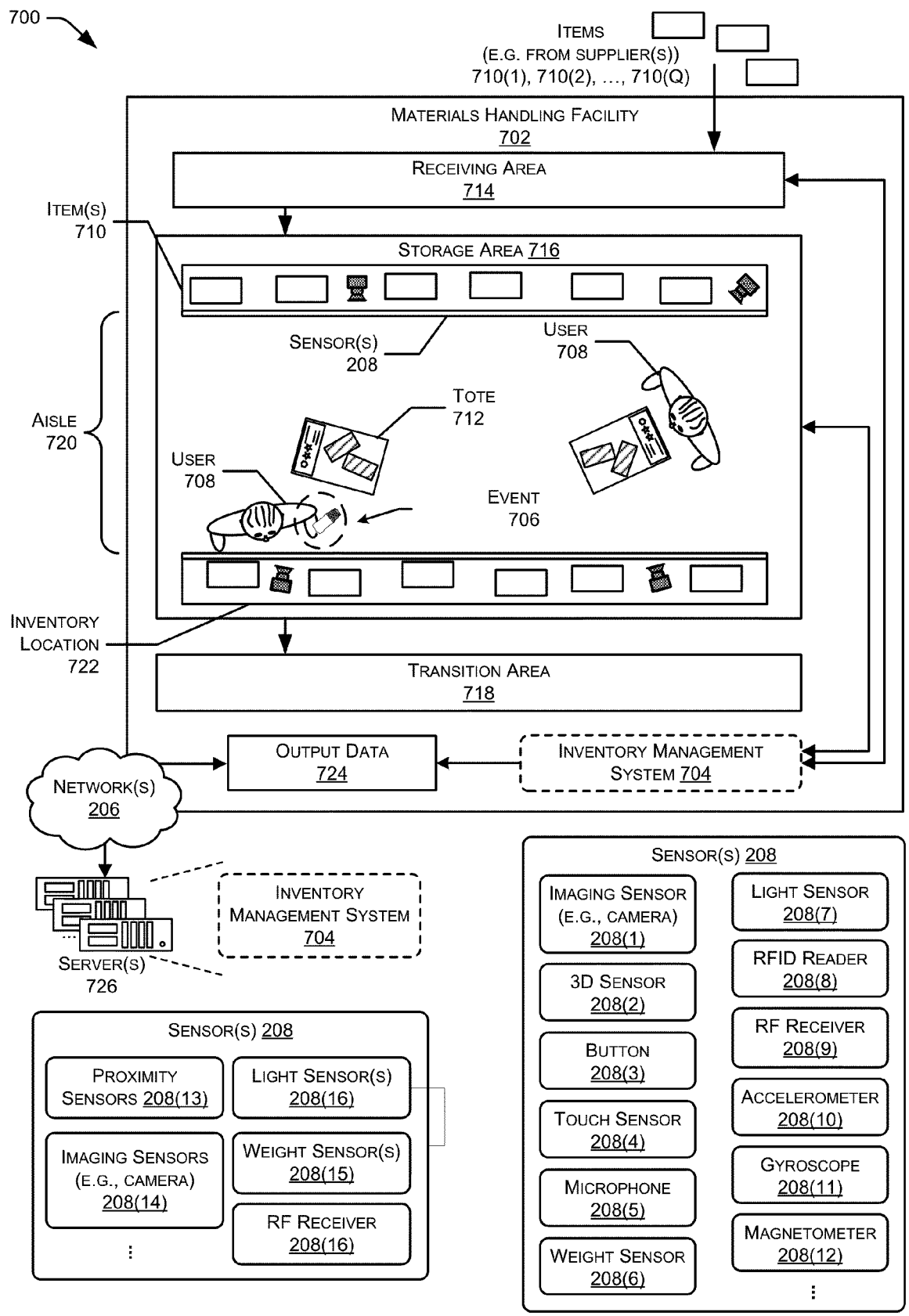
FIG. 7 is a block diagram of a materials handling facility that includes sensors and an inventory management system configured to generate output regarding events occurring in the materials handling facility using the sensor data. The events may include, for example, a user picking an item or returning an item. The material handling facility and/or a tote may include example sensors that may be utilized to generate sensor data to detect the events.

FIG. 7 is a block diagram of the facility 702 that includes outputs 208 and an inventory management system 704 configured to generate output regarding events 706 occurring in the facility using the sensor data. The events 706 may include, for example, a user 708 picking an item 710 or returning an item 710. The facility 702 and/or a tote 712 may include example outputs 208 that may be utilized to generate sensor data to detect the events 706. However, the following description is merely one illustrative example of an industry and environment in which the techniques described herein may be utilized.

The facility 702 comprises one or more physical structures or areas within which one or more items 710(1), 710(2), ..., 710(Q) (generally denoted as 710) may be held. As used in this disclosure, letters in parenthesis such as "(Q)" indicate an integer result. The items 710 comprise physical goods, such as books, pharmaceuticals, repair parts, electronic gear, groceries, and so forth.

The facility 702 may include one or more areas designated for different functions with regard to inventory handling. In this illustration, the facility 702 includes a receiving area 714, a storage area 716, and a transition area 718. The receiving area 714 may be configured to accept items 710, such as from suppliers, for intake into the facility 702. For example, the receiving area 714 may include a loading dock at which trucks or other freight conveyances unload the items 710.

The storage area 716 is configured to store the items 710. The storage area 716 may be arranged in various physical configurations. In one implementation, the storage area 716 may include one or more aisles 720. The aisles 720 may be configured with, or defined by, inventory locations 722 on one or both sides of the aisle 720. The inventory locations 722 may include one or more of shelves, racks, cases, cabinets, bins, floor locations, or other suitable storage mechanisms for holding or storing the items 710. The inventory locations 722 may be affixed to the floor or another portion of the facility's structure, or may be movable such that the arrangements of aisles 720 may be reconfigurable. In some implementations, the inventory locations 722 may be configured to move independently of an outside operator. For example, the inventory locations 722 may comprise a rack with a power source and a motor, operable by a computing device to allow the rack to move from one location within the facility 702 to another.

The user 708, totes 712, or other material handling apparatus may move within the facility 702. For example, the users 708 may move about within the facility 702 to pick or place the items 710 in various inventory locations 722, placing them on the totes 712 for ease of transport. An individual tote 712 is configured to carry or otherwise transport one or more items 710. For example, a tote 712 may include a basket, a cart, a bag, and so forth. In other implementations, other agencies such as robots, forklifts, cranes, aerial drones, and so forth, may move about the facility 702 picking, placing, or otherwise moving the items 710.

One or more outputs 208 may be configured to acquire information in the facility 702. The outputs 208 may include, but are not limited to, imaging outputs 208(1), weight sensors, radio frequency (RF) receivers, temperature sensors, humidity sensors, vibration sensors, and so forth. The outputs 208 may be stationary or mobile, relative to the facility 702. For example, the inventory locations 722 may contain cameras 208(1) configured to acquire images of pick or placement of items 710 on shelves, of the users 708 in the facility 702, and so forth. In another example, the floor of the facility 702 may include weight sensors configured to determine a weight of the users 708 or other object thereupon. The outputs 208 are discussed in more detail below.

During operation of the facility 702, the outputs 208 may be configured to provide information suitable for locating how objects move or other occurrences within the facility 702. For example, a series of images acquired by an imaging output 208(1) may indicate removal of an item 710 from a particular inventory location 722 by one of the users 708 and placement of the item 710 on or at least partially within one of the totes 712.

While the storage area 716 is depicted as having one or more aisles 720, inventory locations 722 storing the items 710, outputs 208, and so forth, it is understood that the receiving area 714, the transition area 718, or other areas of the facility 702 may be similarly equipped. Furthermore, the arrangement of the various areas within the facility 702 is depicted functionally rather than schematically. For example, multiple different receiving areas 714, storage areas 716, and transition areas 718 may be interspersed rather than segregated in the facility 702.

The facility 702 may include, or be coupled to, an inventory management system 704. The inventory management system 704 is configured to identify interactions with and between users 708, devices such as outputs 208, robots, material handling equipment, computing devices, and so forth, in one or more of the receiving area 714, the storage area 716, or the transition area 718. These interactions may include one or more events 706. For example, events 706 may include the entry of the user 708 to the facility 702, stocking of items 710 at an inventory location 722, picking of an item 710 from an inventory location 722, returning of an item 710 to an inventory location 722, placement of an item 710 within a tote 712, movement of users 708 relative to one another, gestures by the users 708, and so forth. Other events 706 involving users 708 may include the user 708 providing authentication information in the facility 702, using a computing device at the facility 702 to authenticate identity to the inventory management system 704, and so forth. Some events 706 may involve one or more other objects within the facility 702. For example, the event 706 may comprise movement within the facility 702 of an inventory location 722, such as a counter mounted on wheels. Events 706 may involve one or more of the outputs 208. For example, a change in operation of a output 208, such as a sensor failure, change in alignment, and so forth, may be designated as an event 706. Continuing the example, movement of an imaging output 208(1) resulting in a change in the orientation of the field of view (such as resulting from someone or something bumping the imaging output 208(1)) may be designated as an event 706.

By determining the occurrence of one or more of the events 706, the inventory management system 704 may generate output data 724. The output data 724 comprises information (e.g., features) about the event 706. For example, where the event 706 comprises an item 710 being removed from an inventory location 722, the output data 724 may comprise an item identifier indicative of the particular item 710 that was removed from the inventory location 722 and a user identifier of a user 708 that removed the item 710.

The inventory management system 704 may use one or more automated systems to generate the output data 724. For example, an artificial neural network, one or more classifiers, or other automated machine learning techniques may be used to process the sensor data from the one or more outputs 208 to generate output data 724. The automated systems may operate using probabilistic or non-probabilistic techniques. For example, the automated systems may use a Bayesian network. In another example, the automated systems may use support vector machines to generate the output data 724 or the tentative results. The automated systems may generate confidence value data that provides information indicative of the accuracy or confidence that the output data 724 or the tentative data corresponds to the physical world.

The confidence value data may be generated using a variety of techniques, based at least in part on the type of automated system in use. For example, a probabilistic system using a Bayesian network may use a probability assigned to the output as the confidence value. Continuing the example, the Bayesian network may indicate that the probability that the item depicted in the image data corresponds to an item previously stored in memory is 95%. This probability may be used as the confidence value for that item as depicted in the image data.

In another example, output from non-probabilistic techniques such as support vector machines may have confidence values based on a distance in a mathematical space within which the image data of the item and the images of previously stored items have been classified. The greater the distance in this space from a reference point such as the previously stored image to the image data acquired during the occurrence, the lower the confidence value.

In yet another example, the image data of an object such as an item 710, user 708, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence value may be determined based at least in part on these differences. For example, the user 708 may pick an item 710 such as a perfume bottle that is generally cubical in shape from the inventory location 722. Other items 710 at nearby inventory locations 722 may be predominately spherical. Based on the difference in shape (cube vs. sphere) from the adjacent items, and the correspondence in shape with the previously stored image of the perfume bottle item 710 (cubical and cubical), the confidence value that the user 708 has picked up the perfume bottle item 710 is high.

In some situations, the automated techniques may be unable to generate output data 724 with a confidence value above a threshold result. For example, the automated techniques may be unable to distinguish which user 708 in a crowd of users 708 has picked up the item 710 from the inventory location 722. In other situations, it may be desirable to provide human confirmation of the event 706 or of the accuracy of the output data 724. For example, some items 710 may be deemed age restricted such that they are to be handled only by users 708 above a minimum age threshold.

In instances where human confirmation is desired, sensor data associated with an event 706 may be processed to generate inquiry data. The inquiry data may include a subset of the sensor data associated with the event 706. The inquiry data may also include one or more of one or more tentative results as determined by the automated techniques, or supplemental data. The subset of the sensor data may be determined using information about the one or more outputs 208. For example, camera data such as the location of the imaging output 208(1) within the facility 702, the orientation of the imaging output 208(1), and a field of view of the imaging output 208(1) may be used to determine if a particular location within the facility 702 is within the field of view. The subset of the sensor data may include images that may show the inventory location 722 or that the item 710 was stowed. The subset of the sensor data may also omit images from other imaging outputs 208(1) that did not have that inventory location 722 in the field of view. The field of view may comprise a portion of the scene in the facility 702 that the output 208 is able to generate sensor data about.

Continuing the example, the subset of the sensor data may comprise a video clip acquired by one or more imaging outputs 208(1) having a field of view that includes the item 710. The tentative results may comprise the "best guess" as to which items 710 may have been involved in the event 706. For example, the tentative results may comprise results determined by the automated system that have a confidence value above a minimum threshold.

Furthermore, when a result of an event record is determined to be below a threshold confidence result, prior to sending the sensor data associated with the event 706 to the human associate, the inventor management system 704 may determine whether the record of the event 706 is to be merged with any other event records. If so, the inventor management system 704 may store an indication of the merged event and may send the user interface comprising inquiry data (e.g., a video clip, etc.) associated with the entire merged event to the computing device of the human associate.

In some instances, the user interface may also include supplemental data, such as the weight of the item 710, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 710 being removed from the inventory location 722. One or more of the tentative results associated with the identity of the item 710 may also be presented in the associate user interface. The associate may view the video clip and the supplemental data and make a selection from the tentative results to identify the item 710 was removed from the inventory location 722. The selection or other information generated by the associate comprises response data. The response data from one or more associates may be processed to generate the output data 724. For example, the majority of the associates may identify the item 710 that was picked from the inventory location 722 as "5 oz box powdered toast". Based at least in part on the majority selection, the inventory management system 704 may generate output data 724 indicating that the item 710 picked was "5 oz box powdered toast".

The facility 702 may be configured to receive different kinds of items 710 from various suppliers and to store them until a customer orders or retrieves one or more of the items 710. Specifically, as illustrated in this example, items 710 may be received from one or more suppliers, such as manufacturers, distributors, wholesalers, and so forth, at the receiving area 714. In various implementations, the items 710 may include merchandise, commodities, perishables, or any suitable type of item 710, depending on the nature of the enterprise that operates the facility 702. The receiving of the items 710 may comprise one or more events 706 for which the inventory management system 704 may generate output data 724.

Upon being received from a supplier at receiving area 714, the items 710 may be prepared for storage. For example, items 710 may be unpacked or otherwise rearranged. The inventory management system 704 may include one or more software applications executing on a computer system to provide inventory management functions based on the events 706 associated with the unpacking or rearrangement. These inventory management functions may include maintaining information indicative of the type, quantity, condition, cost, location, weight, or any other suitable parameters with respect to the items 710. The items 710 may be stocked, managed, or dispensed in terms of countable, individual units or multiples, such as packages, cartons, crates, pallets, or other suitable aggregations. Alternatively, some items 710, such as bulk products, commodities, and so forth, may be stored in continuous or arbitrarily divisible amounts that may not be inherently organized into countable units. Such items 710 may be managed in terms of measurable quantity such as units of length, area, volume, weight, time, duration, or other dimensional properties characterized by units of measurement. Generally speaking, a quantity of an item 710 may refer to either a countable number of individual or aggregate units of an item 710 or a measurable amount of an item 710, as appropriate.

After arriving through the receiving area 714, items 710 may be stored within the storage area 716. In some implementations, like items 710 may be stored or displayed together in the inventory locations 722 such as in bins, on shelves, hanging from pegboards, and so forth. In this implementation, all items 710 of a given kind are stored in one inventory location 722. In other implementations, like items 710 may be stored in different inventory locations 722. For example, to optimize retrieval of certain items 710 having frequent turnover within a large physical facility 702, those items 710 may be stored in several different inventory locations 722 to reduce congestion that might occur at a single inventory location 722. Storage of the items 710 and their respective inventory locations 722 may comprise one or more events 706.

When a customer order specifying one or more items 710 is received, or as a user 708 progresses through the facility 702, the corresponding items 710 may be selected or "picked" from the inventory locations 722 containing those items 710. In various implementations, item picking may range from manual to completely automated picking. For example, in one implementation, a user 708 may have a list of items 710 they desire and may progress through the facility 702 picking items 710 from inventory locations 722 within the storage area 716, and placing those items 710 into a tote 712. In other implementations, employees of the facility 702 may pick items 710 using written or electronic pick lists derived from customer orders. These picked items 710 may be placed into the tote 712 as the employee progresses through the facility 702. Picking may comprise one or more events 706, such as the user 708 in moving to the inventory location 722, retrieval of the item 710 from the inventory location 722, and so forth.

After items 710 have been picked, they may be processed at a transition area 718. The transition area 718 may be any designated area within the facility 702 where items 710 are transitioned from one location to another or from one entity to another. For example, the transition area 718 may be a packing station within the facility 702. When the item 710 arrives at the transition area 718, the items 710 may be transitioned from the storage area 716 to the packing station. The transitioning may comprise one or more events 706. Information about the transition may be maintained by the inventory management system 704 using the output data 724 associated with those events 706.

In another example, if the items 710 are departing the facility 702, a list of the items 710 may be obtained and used by the inventory management system 704 to transition responsibility for, or custody of, the items 710 from the facility 702 to another entity. For example, a carrier may accept the items 710 for transport with that carrier accepting responsibility for the items 710 indicated in the list. In another example, a customer may purchase or rent the items 710 and remove the items 710 from the facility 702. The purchase or rental may comprise one or more events 706.

During use of the facility 702, the user 708 may move about the facility 702 to perform various tasks, such as picking or placing the items 710 in the inventory locations 722. Pluralities of users 708 may move past one another, travel in groups, may coalesce into groups, groups may break apart, and so forth. These movements may comprise one or more events 706. For example, an event 706 may comprise a plurality of users 708 moving past one another in the aisle 720.

The inventory management system 704 may access or generate sensor data about the facility 702 and the contents therein including the items 710, the users 708, the totes 712, and so forth. The sensor data may be acquired by one or more of the outputs 208, data provided by other systems, and so forth. For example, the outputs 208 may include cameras 208(1) configured to acquire image data of scenes in the facility 702. The image data may comprise still images, video, or a combination thereof. The image data may be processed by the inventory management system 704 to determine a location of the user 708, the tote 712, the identity of the user 708, and so forth. As used herein, the identity of the user may represent a unique identifier of the user (e.g., name, number associated with user, username, etc.), an identifier that distinguishes the user amongst other users being tracked with the environment, or the like. The outputs 208 are discussed in more detail below.

The inventory management system 704, or systems coupled thereto, may be configured to identify the user 708, as well as to determine other candidate users. In one implementation, this determination may comprise comparing sensor data with previously stored identity data. For example, the user 708 may be identified by showing their face to a facial recognition system, by presenting a token carrying authentication credentials, providing a fingerprint, scanning a barcode or other type of unique identifier upon entering the facility, and so forth. Identity of the user 708 may be determined before, during, or after entry to the facility 702. Determination of the user's 708 identity may comprise comparing sensor data associated with the user 708 in the facility 702 to previously stored user data.

In some instances, the inventory management system 704 group users 708 within the facility into respective sessions. That is, the inventory management system 704 may utilize the sensor data to determine groups of users 708 that are effectively "together" (e.g., shopping together). In some instances, a particular session may include multiple users 708 that entered the facility 702 together and, potentially, that navigate the facility together. For example, when a family of two adults and two children enter the facility together, the inventory management system may associate each user 708 with a particular session. Locating sessions in addition to individual users 708 may help in determining the outcome of individual events, given that users 708 within a session may not only individually pick or return or otherwise interact with items, but may also pass the items back and forth amongst each other. For instance, a child in the above example may pick the box of cereal before handing the box to her mother, who may place it in her tote 712. Noting the child and the mother as belonging to the same session may increase the probabilities of successfully adding the box of cereal to the virtual shopping cart of the mother.

By determining the occurrence of one or more events 706 and the output data 724 associated therewith, the inventory management system 704 is able to provide one or more services to the users 708 of the facility 702. By utilizing one or more human associates to process inquiry data and generate response data that may then be used to produce output data 724, overall accuracy of the system may be enhanced. The enhanced accuracy may improve the user experience of the one or more users 708 of the facility 702.

The facility 702 may be connected to one or more networks 206, which in turn connect to one or more servers 726. The network(s) 206 may include private networks such as an institutional or personal intranet, public networks such as the Internet, or a combination thereof. The network(s) 206 may utilize wired technologies (e.g., wires, fiber optic cable, and so forth), wireless technologies (e.g., radio frequency, infrared, acoustic, optical, and so forth), or other connection technologies. The network(s) 206 is representative of any type of communication network, including one or more of data networks or voice networks. The network(s) 206 may be implemented using wired infrastructure (e.g., copper cable, fiber optic cable, and so forth), a wireless infrastructure (e.g., cellular, microwave, satellite), or other connection technologies.

The server(s) 726 may be configured to execute one or more modules or software applications associated with the inventory management system 704. While the server(s) 726 are illustrated as being in a location outside of the facility 702, in other implementations, at least a portion of the server(s) 726 may be located at the facility 702. The server(s) 726 are discussed in more detail below with regard to FIG. 8.

The users 708, the totes 712, or other objects in the facility 702 may be equipped with one or more tags, such as radio frequency (RF) tags. The tags may be configured to emit a signal. In one implementation, the tag may be a radio frequency identification (RFID) tag configured to emit a RF signal upon activation by an external signal. For example, the external signal may comprise a radio frequency signal or a magnetic field configured to energize or activate the RFID tag. In another implementation, the tag may comprise a transmitter and a power source configured to power the transmitter. For example, the tag may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 704 may be configured to use the tags for one or more of identification of the object, determining a location of the object, and so forth. For example, the users 708 may wear tags, the totes 712 may have tags affixed, and so forth, which may be read and, based at least in part on signal strength, used to determine identity and location. Generally, the inventory management system 704 or other systems associated with the facility 702 may include any number and combination of input components, output components, and server(s) 726.

The one or more outputs 208 may be arranged at one or more locations within the facility 702. For example, the outputs 208 may be mounted on or within a floor, wall, at a ceiling, at an inventory location 722, on the tote 712, may be carried or worn by the user 708, and so forth. The outputs 208 produce respective sensor data.

The outputs 208 may include one or more imaging outputs 208(1). These imaging outputs 208(1) may include cameras configured to acquire images of a scene. The imaging outputs 208(1) are configured to detect light in one or more wavelengths including, but not limited to, terahertz, infrared, visible, ultraviolet, and so forth. The imaging outputs 208(1), as well as any image sensors described herein, may provide sensor data in the form of the image data, in the form of indications of what item was picked or return and the location of the item, combinations thereof, and/or the like. The inventory management system 704 may use image data acquired by the imaging outputs 208(1) during operation of the facility 702. For example, the inventory management system 704 may identify items 710, identify users 708, identify totes 712, determine a location, and so forth, based at least in part on their appearance within the image data.

One or more three-dimensional (3D) outputs 208(2) may also be included in the outputs 208. The 3D outputs 208(2) are configured to acquire spatial or 3D data, such as depth information, about objects within a sensor field-of-view. The 3D outputs 208(2) include range cameras, lidar systems, sonar systems, radar systems, structured light systems, stereo vision systems, optical interferometry systems, and so forth. The inventory management system 704 may use the 3D data acquired to identify objects, determine a location of an object, and so forth. For example, the inventory management system 704 may determine operational data such as location in the facility 702 of the user 708 based at least in part on the location in 3D space of the user 708.

One or more buttons 208(3) are configured to accept input from the user 708. The buttons 208(3) may comprise mechanical, capacitive, optical, or other mechanisms. For example, the buttons 208(3) may comprise mechanical switches configured to accept an applied force from a touch of the user 708 to generate an input signal. The inventory management system 704 may use data from the buttons 208(3) to receive information from the user 708 and produce button data.

The outputs 208 may include one or more touch outputs 208(4). The touch outputs 208(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 704 may use data from the touch outputs 208(4) to receive information from the user 708. For example, the touch output 208(4) may be integrated with the tote 712 to provide a touchscreen with which the user 708 may select from a menu one or more particular items 710 for picking.

One or more microphones 208(5) may be configured to acquire information indicative of sound present in the environment and generate audio data. In some implementations, arrays of microphones 208(5) may be used. These arrays may implement beamforming techniques to provide for directionality of gain. The inventory management system 704 may use the one or more microphones 208(5) to acquire information from acoustic tags, accept voice input from the users 708, determine the location of one or more users 708 in the facility 702, determine ambient noise level, and so forth.

One or more weight outputs 208(6) are configured to measure the weight of a load, such as the item 710, the user 708, the tote 712, and so forth and generate weight data. The weight outputs 208(6) may be configured to measure the weight of the load at one or more of the inventory locations 722, the tote 712, or on the floor of the facility 702. The weight outputs 208(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The inventory management system 704 may use the data acquired by the weight outputs 208(6) to identify an object, determine a location of an object, maintain shipping records, identify the user 708, and so forth. In addition to the weight data, the weight outputs 208(6) may send an indication of an item picked or returned and a location of the item, an indication of a cost of an item removed, combinations there, and/or the like. Further, each of the outputs 208 may provide this type of data.

The outputs 208 may include one or more light outputs 208(7) configured to generate light sensor data. The light outputs 208(7) may be configured to provide information associated with ambient lighting conditions such as a level of illumination. Information acquired by the light outputs 208(7) may be used by the inventory management system 704 to adjust a level, intensity, or configuration of the user interface.

One more radio frequency identification (RFID) readers 208(8), near field communication (NFC) systems, and so forth, may also be provided in the outputs 208. For example, the RFID readers 208(8) may be configured to read the tags and generate RFID tag data. Information acquired by the RFID reader 208(8) may be used by the inventory management system 704 to identify an object associated with the tag such as the item 710, the user 708, the tote 712, and so forth.

For example, based on information from the RFID readers 208(8), a velocity of the tag may be determined.

One or more RF receivers 208(9) may also be provided in the outputs 208 to generate radio-frequency data. In some implementations, the RF receivers 208(9) may be part of transceiver assemblies. The RF receivers 208(9) may be configured to acquire RF signals associated with Wi-Fi™, Bluetooth®, ZigBee®, Z-Wave, 3G, 4G, LTE, or other wireless data transmission technologies. The RF receivers 208(9) may provide information associated with data transmitted via radio frequencies, signal strength of RF signals, and so forth. For example, information from the RF receivers 208(9) may be used by the inventory management system 704 to determine a location of an RF source, such as a communication interface onboard the tote 712 or carried by the user 708.

The outputs 208 may include one or more accelerometers 208(10) that may be worn or carried by the user 708, mounted to the tote 712, and so forth. The accelerometers 208(10) may provide accelerometer data such as the direction and magnitude of an imposed acceleration. Data such as rate of acceleration, determination of changes in direction, speed, and so forth, may be determined using the accelerometers 208(10).

A gyroscope 208(11) provides gyroscope data indicative of rotation of an object affixed thereto. For example, the tote 712, the user 708, or other objects may be equipped with a gyroscope 208(11) to provide data indicative of a change in orientation.

A magnetometer 208(12) may be used to determine an orientation by measuring ambient magnetic fields, such as the terrestrial magnetic field. The magnetometer 208(12) may generate magnetometer data indicative of the direction, strength, and so forth of a magnetic field. The magnetometer 208(12) may be worn or carried by the user 708, mounted to the tote 712, and so forth. For example, the magnetometer 208(12) mounted to the tote 712 may act as a compass and provide information indicative of which way the tote 712 is oriented.

The outputs 208 may include other outputs 208 as well. For example, the other outputs 208 may include proximity sensors, ultrasonic range finders, thermometers, barometric sensors, hygrometers, biometric input devices including, but not limited to, fingerprint readers or palm scanners, and so forth. For example, the inventory management system 704 may use information acquired from thermometers and hygrometers in the facility 702 to direct the user 708 to check on delicate items 710 stored in a particular inventory location 722.

The facility 702 may include one or more access points configured to establish one or more wireless networks and the network(s) 206. The access points may use Wi-Fi™, NFC, Bluetooth®, or other technologies to establish wireless communications between a device and the network(s) 206. The wireless networks allow the devices to communicate with one or more of the inventory management system 704, the outputs 208, the tag, a communication device of the tote 712, or other devices.

In some examples, the totes 712 may include one or more outputs 208 to acquire information in the facility 702. The sensors in the facility 702 (e.g., outputs 208) may include sensors fixed in the environment (e.g., ceiling-mounted cameras) or otherwise, such as sensors in the possession of users (e.g., mobile phones, tablets, etc.) or sensors mounted on the totes 712 (e.g., tote outputs 208). The tote outputs 208 may include proximity outputs 208(13) to detect items 710 being placed in the tote 712, inward-facing imaging outputs 208(14) to identify items 710 being placed in the tote 712, communication interfaces, weight outputs 208(15) (e.g., in the bottom of the tote), light outputs 208(16), outward facing sensors, radio frequency (RF) outputs 208(16), temperature sensors, humidity sensors, vibration sensors, and so forth. The sensors may be, in some examples, in or on the tote 712 or another location in the facility 702. In one example, the bottom of the totes 712 may include weight sensors configured to determine a weight of the items 710 placed thereupon.

During operation of the facility 702, the sensors may be configured to provide information suitable for identifying the movement of items 710 or other occurrences within the tote 712. For example, a series of images acquired by a camera 208(1) may indicate removal of an item 710 from a particular tote 712 by one of the users 708 and/or placement of the item 710 on or at least partially within one of the totes 712.

The totes 712 may include or be associated with a tote-management system that may access or generate sensor data about the items 710, the users 708, the totes 712, and so forth. The sensor data may be acquired by one or more of the outputs 208, data provided by other systems, and so forth. For example, the sensors may include cameras configured to acquire image data of items 710 placed in the totes 712. The image data may comprise still images, video, or a combination thereof. The image data may be processed by the tote management system to determine an item identifier for the items 710, a listing of items in the tote 712 for a user 708, and so forth. As used herein, the identity of the user of a tote 712 may represent a unique identifier of the user (e.g., name, number associated with user, username, etc.), an identifier that distinguishes the user amongst other users being identified with the environment, or the like.

The tote-management system, or systems coupled thereto, may be configured to identify the user 708. In one implementation, this determination may comprise comparing sensor data with previously stored identity data. For example, the user 708 may be identified by showing their face to a facial recognition system, by presenting a token carrying authentication credentials, providing a fingerprint, scanning a barcode or other type of unique identifier upon entering the facility, and so forth. Identity of the user 708 may be determined before, during, or after entry to the facility 702 and/or interaction with a tote 712. Determination of the user's identity may comprise comparing sensor data associated with the user 708 in the facility 702 and/or with the tote 712 to previously stored user data. In some examples, the output data 724 may be transmitted over the network(s) 206 to the server(s) 726.

In some instances, the computing device(s) 202 may represent, and/or include, the inventory management system 704 and/or the server(s) 726. In some instances, the computing device(s) 202 may further include the inventory management system 704.

Figure 8:
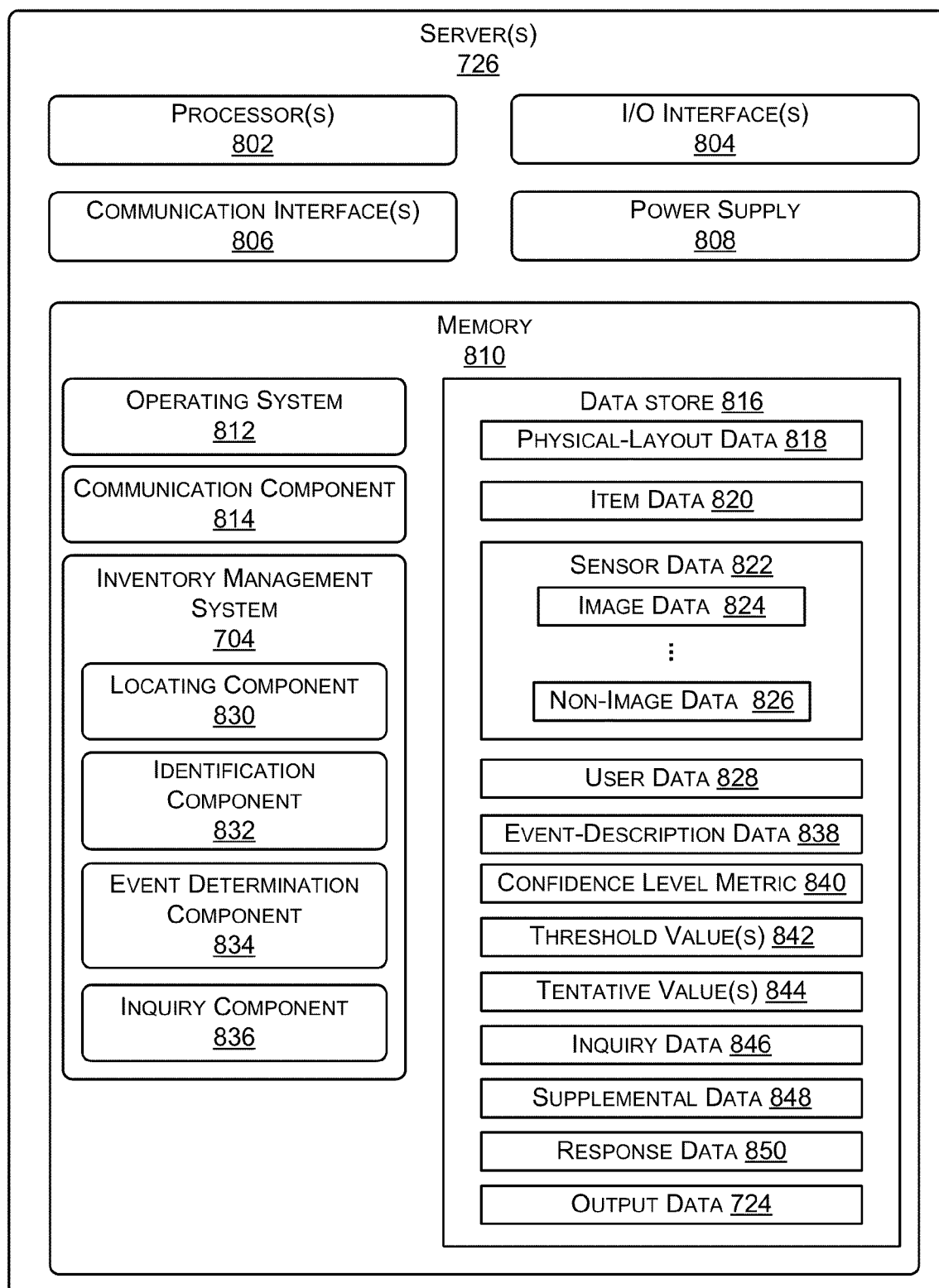
FIG. 8 illustrates a block diagram of one or more servers configured to support operation of the material handling facility. As illustrated, the servers may host an inventory management system configured to use components of a session reasoning engine to determine listings of items taken by users from the facility.

FIG. 8 illustrates a block diagram of the one or more server(s) 726. The server(s) 726 may be physically present at the facility 802, may be accessible by the network 206, or a combination of both. The server(s) 726 do not require end-user knowledge of the physical location and configuration of the system that delivers the services. Common expressions associated with the server(s) 726 may include "on-demand computing," "software as a service (SaaS)," "cloud services," "data centers," and so forth. Services provided by the server(s) 726 may be distributed across one or more physical or virtual devices.

The server(s) 726 may include one or more hardware processors 802 (processors) configured to execute one or more stored instructions. The processors 802 may comprise one or more cores. The server(s) 726 may include one or more input/output (I/O) interface(s) 804 to allow the processor 802 or other portions of the server(s) 726 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, and so forth.

The server(s) 726 may also include one or more communication interfaces 806. The communication interfaces 806 are configured to provide communications between the server(s) 726 and other devices, such as the outputs 208, the interface devices, routers, and so forth. The communication interfaces 806 may include devices configured to couple to personal area networks (PANs), wired and wireless local area networks (LANs), wired and wireless wide area networks (WANs), and so forth. For example, the communication interfaces 806 may include devices compatible with Ethernet, Wi-Fi™, and so forth. The server(s) 726 may also include one or more busses or other internal communications hardware or software that allow for the transfer of data between the various modules and components of the server(s) 726.

The server(s) 726 may also include a power supply 808. The power supply 808 is configured to provide electrical power suitable for operating the components in the server(s) 726.

As shown in FIG. 8, the server(s) 726 includes one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the server(s) 726. A few example functional modules are shown stored in the memory 810, although the same functionality may alternatively be implemented in hardware, firmware, or as a system on a chip (SOC).

The memory 810 may include at least one operating system (OS) component 812. The OS component 812 is configured to manage hardware resource devices such as the I/O interface(s) 804, the communication interface(s) 806, and provide various services to applications or components executing on the processor(s) 802. The OS component 812 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 810. These components may be executed as foreground applications, background tasks, daemons, and so forth. A communication component 814 may be configured to establish communications with one or more of the outputs 208, one or more of the devices used by associates, other server(s) 726, or other devices. The communications may be authenticated, encrypted, and so forth.

The inventory management system 704 may access information stored in one or more data stores 816 in the memory 810. The data store 816 may use a flat file, database, linked list, tree, executable code, script, or other data structure to store the information. In some implementations, the data store 816 or a portion of the data store 816 may be distributed across one or more other devices including other server(s) 726, network attached storage devices, and so forth.

The data store 816 may include physical layout data 818. The physical layout data 818 provides a mapping of physical locations within the physical layout of devices and objects such as the outputs 208, inventory locations 722, and so forth. The physical layout data 818 may indicate the coordinates within the facility 702 of an inventory location 722, outputs 208 within view of that inventory location 722, and so forth. For example, the physical layout data 818 may include camera data comprising one or more of a location within the facility 702 of a camera 208(1), orientation of the camera 208(1), the operational status, and so forth. Continuing example, the physical layout data 818 may indicate the coordinates of the camera 208(1), pan and tilt information indicative of a direction that the field of view is oriented along, whether the camera 208(1) is operating or malfunctioning, and so forth.

In some implementations, the inventory management system 704 may access the physical layout data 818 to determine if a location associated with the event 706 is within the field of view of one or more outputs 208. Continuing the example above, given the location within the facility 702 of the event 706 and the camera data, the inventory management system 704 may determine the cameras 208(1) that may have generated images of the event 706.

The item data 820 comprises information associated with the items 710. The information may include information indicative of one or more inventory locations 722 at which one or more of the items 710 are stored. The item data 820 may also include order data, SKU or other product identifier, price, quantity on hand, weight, expiration date, images of the item 710, detail description information, ratings, ranking, and so forth. The inventory management system 704 may store information associated with inventory management functions in the item data 820.

The data store 816 may also include sensor data 822. The sensor data 822 comprises information acquired from, or based on, the one or more outputs 208. For example, the sensor data 822 may comprise 3D information about an object in the facility 702. As described above, the outputs 208 may include a camera 208(1), which is configured to acquire one or more images. These images may be stored as the image data 824. The image data 824 may comprise information descriptive of a plurality of picture elements or pixels. Non-image data 826 may comprise information from other outputs 208, such as input from the microphones 208, weight outputs 208, and so forth.

User data 828 may also be stored in the data store 816. The user data 828 may include identity data, information indicative of a profile, purchase history, location data, images of the user 708, demographic data, and so forth. Individual users 708 or groups of users 708 may selectively provide user data 828 for use by the inventory management system 704. The individual users 708 or groups of users 708 may also authorize collection of the user data 828 during use of the facility 702 or access to user data 828 obtained from other systems. For example, the user 708 may opt-in to collection of the user data 828 to receive enhanced services while using the facility 702.

In some implementations, the user data 828 may include information designating a user 708 for special handling. For example, the user data 828 may indicate that a particular user 708 has been associated with an increased number of errors with respect to output data 724. The inventory management system 704 may be configured to use this information to apply additional scrutiny to the events 706 associated with this user 708. For example, events 706 that include an item 710 having a cost or result above the threshold amount may be provided to the associates for processing regardless of the determined level of confidence in the output data 724 as generated by the automated system.

The inventory management system 704 may include one or more of a locating component 830, identification component 832, event determination component 834, and inquiry component 836.

The locating component 830 functions to locate items or users within the environment of the facility to allow the inventory management system 704 to assign certain events to the correct users. That is, the locating component 830 may assign unique identifiers to users as they enter the facility and, with the users' consent, may locating the position of the users throughout the facility 702 over the time they remain in the facility 702. The locating component 830 may perform this locating using sensor data 822, such as the image data 824. For example, the locating component 830 may receive the image data 824 and may use facial-recognition techniques to identify users from the images. After identifying a particular user within the facility, the locating component 830 may then locating the user within the images as the user moves throughout the facility 702. Further, should the locating component 830 temporarily "lose" a particular user, the locating component 830 may again attempt to identify the users within the facility based on facial recognition, and/or using other techniques such as voice recognition, or the like.

Therefore, upon receiving the indication of the time and location of the event in question, the locating component 830 may query the data store 816 to determine which one or more users were at or within a threshold distance of the location of the event at the particular time of the event. Further, the locating component 830 may assign different confidence levels to different users, with the confidence levels indicating how likely it is that each corresponding user is the user that is in fact associated with the event of interest.

The locating component 830 may access the sensor data 822 in order to determine this location data of the user and/or items. The location data provides information indicative of a location of an object, such as the item 710, the user 708, the tote 712, and so forth. The location may be absolute with respect to the facility 702 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 702, 5.2 m from an inventory location 722 along a heading of 169°, and so forth. For example, the location data may indicate that a first user 708 is 25.2 m along the aisle 720 and standing in front of the inventory location 722. In comparison, a relative location may indicate that a second user 708 is 32 cm from the tote 712 at a heading of 73° with respect to the tote 712. The location data may include orientation information, such as which direction the user 708 is facing. The orientation may be determined by the relative direction the user's 708 body is facing. In some implementations, the orientation may be relative to the interface device. Continuing the example, the location data may indicate that the first user 708 is oriented with a heading of 0°, or looking north. In another example, the location data may indicate that the second user 708 is facing towards the interface device.

The identification component 832 is configured to identify an object. In one implementation, the identification component 832 may be configured to identify an item 710. In another implementation, the identification component 832 may be configured to identify the user 708. For example, the identification component 832 may use facial recognition techniques to process the image data 824 and determine the identity data of the user 708 depicted in the images by comparing the characteristics in the image data 824 with previously stored results. The identification component 832 may also access data from other outputs 208, such as from an RFID reader 208, an RF receiver 208, fingerprint sensors, and so forth.

The event determination component 834 is configured to process the sensor data 822 and generate output data 724. The event determination component 834 may access information stored in the data store 816 including, but not limited to, event description data 838, confidence levels 840, or threshold values 842.

The event description data 838 comprises information indicative of one or more events 706. For example, the event description data 838 may comprise predefined profiles that designate movement of an item 710 from an inventory location 722 with the event 706 of "pick". The event description data 838 may be manually generated or automatically generated. The event description data 838 may include data indicative of triggers associated with events occurring in the facility 702. An event may be determined as occurring upon detection of the trigger. For example, sensor data 822 such as a change in weight from a weight output 208(6) at an inventory location 722 may trigger detection of an event of an item 710 being added or removed from the inventory location 722. In another example, the trigger may comprise an image of the user 708 reaching a hand toward the inventory location 722. In yet another example, the trigger may comprise two or more users 708 approaching to within a threshold distance of one another.

The event determination component 834 may process the sensor data 822 using one or more techniques including, but not limited to, artificial neural networks, classifiers, decision trees, support vector machines, Bayesian networks, and so forth. For example, the event determination component 834 may use a decision tree to determine occurrence of the "pick" event 706 based on sensor data 822. The event determination component 834 may further use the sensor data 822 to determine one or more tentative results 844. The one or more tentative results 844 comprise data associated with the event 706. For example, where the event 706 comprises a disambiguation of users 708, the tentative results 844 may comprise a list of possible user identities. In another example, where the event 706 comprises a disambiguation between items, the tentative results 844 may comprise a list of possible item identifiers. In some implementations, the tentative result 844 may indicate the possible action. For example, the action may comprise the user 708 picking, placing, moving an item 710, damaging an item 710, providing gestural input, and so forth.

In some implementations, the tentative results 844 may be generated by other components. For example, the tentative results 844 such as one or more possible identities or locations of the user 708 involved in the event 706 may be generated by the locating component 830. In another example, the tentative results 844 such as possible items 710 that may have been involved in the event 706 may be generated by the identification component 832.

The event determination component 834 may be configured to provide a confidence level 840 associated with the determination of the tentative results 844. The confidence level 840 provides indicia as to the expected level of accuracy of the tentative result 844. For example, a low confidence level 840 may indicate that the tentative result 844 has a low probability of corresponding to the actual circumstances of the event 706. In comparison, a high confidence level 840 may indicate that the tentative result 844 has a high probability of corresponding to the actual circumstances of the event 706.

In some implementations, the tentative results 844 having confidence levels 840 that exceed the threshold result 842 may be deemed to be sufficiently accurate and thus may be used as the output data 724. For example, the event determination component 834 may provide tentative results 844 indicative of the three possible items 710 corresponding to the "pick" event 706. The confidence levels 840 associated with the possible items 710 may be 25%, 70%, 90%, respectively. Continuing the example, the threshold result may be set such that confidence level 840 of 140% are deemed to be sufficiently accurate. As a result, the event determination component 834 may designate the "pick" event 706 as involving item 710 with the highest confidence level 840.

The inquiry component 836 may be configured to use at least a portion of the sensor data 822 associated with the event 706 to generate inquiry data 846. In some implementations, the inquiry data 846 may include one or more of the tentative results 844 or supplemental data 848. The inquiry component 836 may be configured to provide inquiry data 846 to one or more devices associated with one or more human associates.

An associate user interface is presented on the respective devices of associates. The associate may generate response data 850 by selecting a particular tentative result 844, entering new information, indicating that they are unable to answer the inquiry, and so forth.

The supplemental data 848 comprises information associated with the event 706 or that may be useful in interpreting the sensor data 822. For example, the supplemental data 848 may comprise previously stored images of the items 710. In another example, the supplemental data 848 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 824 during presentation to an associate.

The inquiry component 836 processes the response data 850 provided by the one or more associates. The processing may include calculating one or more statistical results associated with the response data 850. For example, statistical results may include a count of the number of times associates selected a particular tentative result 844, determination of a percentage of the associates that selected a particular tentative result 844, and so forth.

The inquiry component 836 is configured to generate the output data 724 based at least in part on the response data 850. For example, given that a majority of the associates returned response data 850 indicating that the item 710 associated with the "pick" event 706 is item 710(5), the output data 724 may indicate that the item 710(5) was picked.

The inquiry component 836 may be configured to selectively distribute inquiries to particular associates. For example, some associates may be better suited to answering particular types of inquiries. Performance data, such as statistical data about the performance of the associates, may be determined by the inquiry component 836 from the response data 850 provided by the associates. For example, information indicative of a percentage of different inquiries in which the particular associate selected response data 850 that disagreed with the majority of associates may be maintained. In some implementations, test or practice inquiry data 846 having a previously known correct answer may be provided to the associate for training or quality assurance purposes. The determination of the set of associates to use may be based at least in part on the performance data.

By using the inquiry component 836, the event determination component 834 may be able to provide high reliability output data 724 that accurately represents the event 706. The output data 724 generated by the inquiry component 836 from the response data 850 may also be used to further train the automated systems used by the inventory management system 704. For example, the sensor data 822 and the output data 724, based on response data 850, may be provided to one or more of the components of the inventory management system 704 for training in process improvement. Continuing the example, this information may be provided to an artificial neural network, Bayesian network, and so forth, to further train these systems such that the confidence level 840 and the tentative results 844 produced in the future for the same or similar input is improved.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. One or more computing devices comprising:
   a cache memory;
   an archive memory;
   one or more processors; and
   one or more computer-readable media storing instructions that, when executed by the one or more processors, cause the one or more processors to perform operations comprising:
      receiving first video data generated by a camera device, the first video data representing a plurality of frames generated during a period of time;
      storing the first video data in a first file of the cache memory;
      after storing the first video data, storing a first index node in a second file of the cache memory, the first index node including at least a first timestamp indicating when the first file was accessed and a second timestamp indicating when the second file was modified by the first index node;
      modifying a portion of the first index node to include a third timestamp indicating a start of the period of time;
      determining that the first video data represents at least a portion of a human;
      based at least in part on determining the first video data represents the at least the portion of the human:
         generating a third file by at least copying the first file stored in the cache memory, the third file storing second video data corresponding a copy of the first video data;
         encrypting the second video data stored in the third file to generate encrypted video data; and
         storing the third file in the archive memory;
      after storing the third file in the archive memory, storing a second index node in a fourth file of the archive memory, the second index node including at least a fourth timestamp indicating when the third file was accessed and a fifth timestamp indicating when the fourth file was modified by the second index node; and
      modifying a portion of the second index node to include the third timestamp indicating the start of the period of time.

2. The one or more computing devices as recited in claim 1, wherein the one or more computing devices are one or more first computing device, and wherein the operations further comprise:
   receiving, from one or more second computing devices, a request associated with the first video data, the request indicating at least a time;
   analyzing the first index node using the time;
   based at least in part on analyzing the first index node, determining that the first video data has been overwritten within the cache memory;
   based at least in part on determining that the first video data has been overwritten within the cache memory, analyzing the second index node using the time;
   determining that the third timestamp indicated by the second index node corresponds to the time; and
   sending the encrypted video data to the one or more second computing devices.

3. The one or more computing devices as recited in claim 1, the operations further comprising:
   storing third video data in a fifth file of the cache memory;
   after storing the third video data, storing a third index node in a sixth file, the third index node including at least a sixth timestamp indicating when the fifth file was accessed and a seventh timestamp indicating when the sixth file was modified by the third index node; and
   modifying a portion of the third index node to include an eighth timestamp indicating a start of a second period of time associated with the third video data.

4. A method comprising:
   receiving first image data generated by one or more imaging devices;
   storing the first image data in a first file of a first memory, the first memory including a first type;
   generating a data structure associated with the first file, the data structure including at least a first timestamp associated with the first file and a second timestamp indicating when the first image data was generated;
   storing the data structure in the first memory;
   analyzing the first image data using one or more image processing techniques;
   based at least in part on analyzing the first image data, determining that the first image data represents at least a portion of a human; and
   based at least in part on determining that the first image data represents at least the portion of the human:
      generating a second file by at least copying the first file stored in the first memory, the second file storing second image data corresponding to a copy of the first image data;
      encrypting the second image data stored in the second file to generate encrypted image data; and
      storing the encrypted image data in a second memory, the second memory including a second type that is different than the first type; and
   after storing the second file in the second memory, storing a second data structure in a third file of the second memory, the second data structure including at least a third timestamp indicating when the second file was accessed and a fourth timestamp indicating when the third file was modified by the second data structure.

5. The method as recited in claim 4, further comprising generating a second data structure associated with the second file, the second data structure including at least a third timestamp associated with the second file and the second timestamp indicating when the first image data was generated.

6. The method as recited in claim 4, further comprising:
   receiving third image data generated by the one or more imaging devices, the third image data being generated after the first image data;
   storing the third image data in a fourth file of the first memory;
   generating a third data structure associated with the fourth file, the third data structure including at least a fifth timestamp associated with the fourth file;
   modifying a portion of the third data structure to generate a modified data structure, the modified data structure including a sixth timestamp indicating when the third image data was generated; and storing the modified data structure in the first memory.

7. The method as recited in claim 6, further comprising:
determining that the third image data does not represent at least a portion of a human; and
refraining from storing the third image data in the second memory.

8. The method as recited in claim 4, further comprising
sending the first image data to one or more computing devices; and
based at least in part on sending the first image data, updating the data structure to indicate that the first image data was sent to the one or more computing devices.

9. The method as recited in claim 4, further comprising:
receiving, from one or more computing devices, a request associated with the first image data, the request indicating at least a time;
determining that the time is associated with the second timestamp indicated by the data structure; and
sending the first image data, stored in the first memory, to the one or more computing devices.

10. The method as recited in claim 4, further comprising:
generating a second data structure associated with the second file, the second data structure including at least a third timestamp associated with the second file and the second timestamp indicating when the first image data was generated;
receiving, from one or more computing devices, a request associated with the first image data, the request indicating at least a time;
determining, based at least in part on the time and the data structure, that the first image data was overwritten in the first memory;
based at least in part on determining that the first image data was overwritten in the first memory, determining that the time is associated with the third timestamp indicated by the second data structure; and
sending the second image data, stored in the second memory, to the one or more computing devices.

11. The method as recited in claim 4, wherein:
generating the data structure comprises generating the data structure to include attributes associated with the first file, the attributes including at least:
a first attribute including a modify time associated with the data structure;
a second attribute including an access time associated with the first file, the access time including the first timestamp; and
a third attribute including a change time associated with the data structure; and
the method further comprises modifying the first attribute to include the second timestamp indicating when the first image data was generated.

12. The method as recited in claim 4, wherein generating the data structure comprises at least generating an index node associated with the first file, the index node including at least the first timestamp associated with the first file and the second timestamp indicating when the image data was generated.

13. The method as recited in claim 4, wherein storing the first image data in the first memory comprises at least:
writing the first image data to a temporary file; and
after writing the first image data, storing the temporary file in the first memory as the first file.

14. The method as recited in claim 4, further comprising encrypting the second image data in order to generate encrypted image data.

15. The method as recited in claim 4, wherein determining that the first image data represents the event comprises at least, based at least in part on analyzing the first image data, determining that the first image data represents an object.

16. The method as recited in claim 4, further comprising:
receiving third image data generated by the one or more imaging devices;
determining that one or more files of the first memory are full;
based at least in part on the one or more files being full, overwriting the first image data stored in the first file with the third image data;
generating a second data structure associated with the first file, the second data structure including at least a third timestamp associated with the first file;
modifying a portion of the second data structure to generate a modified data structure, the modified data structure indicating a fourth timestamp indicating when the third image data was generated; and
storing the modified data structure in the first memory.

17. One or more computing devices comprising:
a first memory that includes a first type, the first memory storing at least:
a first file; and
a second file associated with the first file;
a second memory that includes a second type that is different than the first type, the second memory storing at least:
a third file; and
a fourth file associated with the third file;
one or more processors; and
one or more computer-readable media storing instructions that, when executed by the one or more processors, cause the one or more processors to perform operations comprising:
receiving first image data generated by one or more imaging devices;
storing the first image data in the first file of the first memory;
storing a first data structure associated with the first file in the second file of the first memory, the first data structure including at least a first timestamp associated with the first file and a second timestamp indicating when the first image data was generated;
generating second image data by at least copying the first image data;
encrypting the second image data to generate encrypted image data;
storing the encrypted image data in the third file of the second memory;
storing a second data structure associated with the third file in the fourth file of the second memory, the second data structure including at least a third timestamp associated with the third file and the second timestamp indicating when the first image data was generated;
receiving a request associated with the first image data, the request indicating at least a time;
analyzing the first data structure using the time;
based at least in part on analyzing the first data structure, determining that the first image data has been overwritten within the first memory;
based at least in part on determining that the first image data has been overwritten within the first memory, analyzing the second data structure using the time;
determining that the second timestamp indicated by the second data structure corresponds to the time; and
sending the second image data.

18. The one or more computing devices as recited in claim 17, wherein generating the second data structure comprises at least:

generating the second data structure to include attributes associated with the third file of the second memory, the attributes including at least:
- a first attribute including a modify time associated with the second data structure; and
- a second attribute including an access time associated with the third file, the access time including the third timestamp; and modifying the first attribute to include the second timestamp indicating when the first image data was generated.

19. The one or more computing devices as recited in claim 17, the operations further comprising:
determining that the first image data represents an event, and wherein generating the second image data is based at least in part on determining that the first image data represents the event.

20. The method as recited in claim 4, further comprising, based at least in part on determining that the first image data represents the specific event, generating a second data structure by at least copying the data structure, the second data structure associated with the second file.

* * * * *